(12) United States Patent
Andersen et al.

(10) Patent No.: US 7,833,555 B2
(45) Date of Patent: *Nov. 16, 2010

(54) CHEWING GUM COMPRISING AT LEAST TWO DIFFERENT BIODEGRADABLE POLYMERS

(75) Inventors: Lone Andersen, Middelfart (DK); Helle Wittorff, Vejle Ost (DK)

(73) Assignee: Gumlink A/S (DK)

( * ) Notice: Subject to any disclaimer, the term of this patent is extended or adjusted under 35 U.S.C. 154(b) by 728 days.

This patent is subject to a terminal disclaimer.

(21) Appl. No.: 11/088,109

(22) Filed: Mar. 23, 2005

(65) Prior Publication Data

US 2005/0244538 A1     Nov. 3, 2005

Related U.S. Application Data

(63) Continuation of application No. PCT/DK03/00626, filed on Sep. 24, 2003, and a continuation of application No. PCT/DK02/00627, filed on Sep. 24, 2002.

(51) Int. Cl.
A23G 4/08 (2006.01)

(52) U.S. Cl. ................................. 426/6; 426/3; 426/4

(58) Field of Classification Search ............ 426/3, 426/6

See application file for complete search history.

(56) References Cited

U.S. PATENT DOCUMENTS

| | | | |
|---|---|---|---|
| 2,007,965 A | 7/1935 | Ellis | |
| 2,353,927 A | 10/1942 | Pickett | |
| 2,635,964 A | 1/1951 | Hewitt | |
| 3,262,784 A | 7/1966 | Bucher | |
| 3,440,060 A | 4/1969 | Rife et al. | |
| 3,800,006 A | 3/1974 | Katayana | |
| 4,057,537 A | 11/1977 | Sinclair | |
| 4,329,369 A | 5/1982 | Tezuka | |
| 4,525,363 A | 6/1985 | D'Ameilia | |
| 4,671,967 A | 6/1987 | Patel et al. | |
| 4,731,435 A | 3/1988 | Greene et al. | |
| 4,753,805 A | 6/1988 | Cherukuri et al. | |
| 4,882,168 A | 11/1989 | Casey et al. | |
| 5,354,556 A | 10/1994 | Sparks | |
| 5,429,827 A | 7/1995 | Song et al. | |
| 5,433,960 A | 7/1995 | Meyers | |
| 5,523,098 A | 6/1996 | Synosky et al. | |
| 5,530,074 A | 6/1996 | Jarrett et al. | |
| 5,610,266 A | 3/1997 | Buchholz | |
| 5,672,367 A | 9/1997 | Grijpma et al. | |
| 5,866,179 A | 2/1999 | Testa | |
| 6,013,287 A | 1/2000 | Bunczek et al. | |
| 6,153,231 A | 11/2000 | Li et al. | |
| 6,190,773 B1 | 2/2001 | Imamura et al. | |
| 6,194,008 B1 | 2/2001 | Li et al. | |
| 6,322,806 B1 | 11/2001 | Ream et al. | |
| 6,441,126 B1 | 8/2002 | Cook et al. | |
| 6,733,818 B2 | 5/2004 | Luo | |
| 2001/0002998 A1 | 6/2001 | Ream et al. | |
| 2004/0115305 A1 | 6/2004 | Andersen et al. | |
| 2004/0142066 A1 | 7/2004 | Andersen et al. | |
| 2004/0146599 A1 | 7/2004 | Andersen et al. | |
| 2004/0156949 A1 | 8/2004 | Andersen et al. | |
| 2004/0180111 A1 | 9/2004 | Andersen et al. | |
| 2006/0051455 A1 | 3/2006 | Andersen et al. | |
| 2006/0099300 A1 | 5/2006 | Andersen et al. | |
| 2006/0121156 A1 | 6/2006 | Andersen et al. | |
| 2006/0147580 A1 | 7/2006 | Nissen et al. | |

FOREIGN PATENT DOCUMENTS

| | | |
|---|---|---|
| EP | 0 151 344 | 8/1985 |
| EP | 0 258 780 | 3/1988 |
| EP | 0 415 656 | 3/1991 |
| EP | 0427185 | 5/1991 |
| EP | 0 500 098 | 8/1992 |
| EP | 0 558 965 | 9/1993 |
| EP | 1 066 759 | 1/2001 |
| EP | 0 711 506 | 4/2003 |
| EP | 1 306 013 | 5/2003 |
| EP | 1354908 | 10/2003 |
| JP | 08-196214 | 8/1996 |
| JP | 09-047226 | 2/1997 |
| WO | WO 94/11441 | 5/1994 |

(Continued)

OTHER PUBLICATIONS

Manly et al., "Substances Capable of Decreasing the Acid Solubility of Tooth Enamel", J. Dent. Res., 1949, vol. 28, No. 2, pp. 160-171.
Martindale, The Extra Pharmacopoeia, 28$^{th}$ Edition, 1982, pp. 547-548.
Food and Drug Administration, CFR, Title 21, Section 172.615 as "Masticatory Substances of Natural Vegetable Origin".
Odian, G., "Principles of Polymerization", 3$^{rd}$ Edition, Wiley-Interscience, New York, NY 1991, pp. 17-19.
International Search Report; International Application No. PCT/DK 02/00626; International Search Date May 27, 2003; Date of Mailing Jun. 24, 2003; 3 pgs.

(Continued)

Primary Examiner—Keith D Hendricks
Assistant Examiner—Nikki H Dees
(74) Attorney, Agent, or Firm—St. Onge Steward Johnston & Reens LLC

(57) ABSTRACT

The invention relates to chewing gum comprising at least two different biodegradable polymers.

Figure 1:
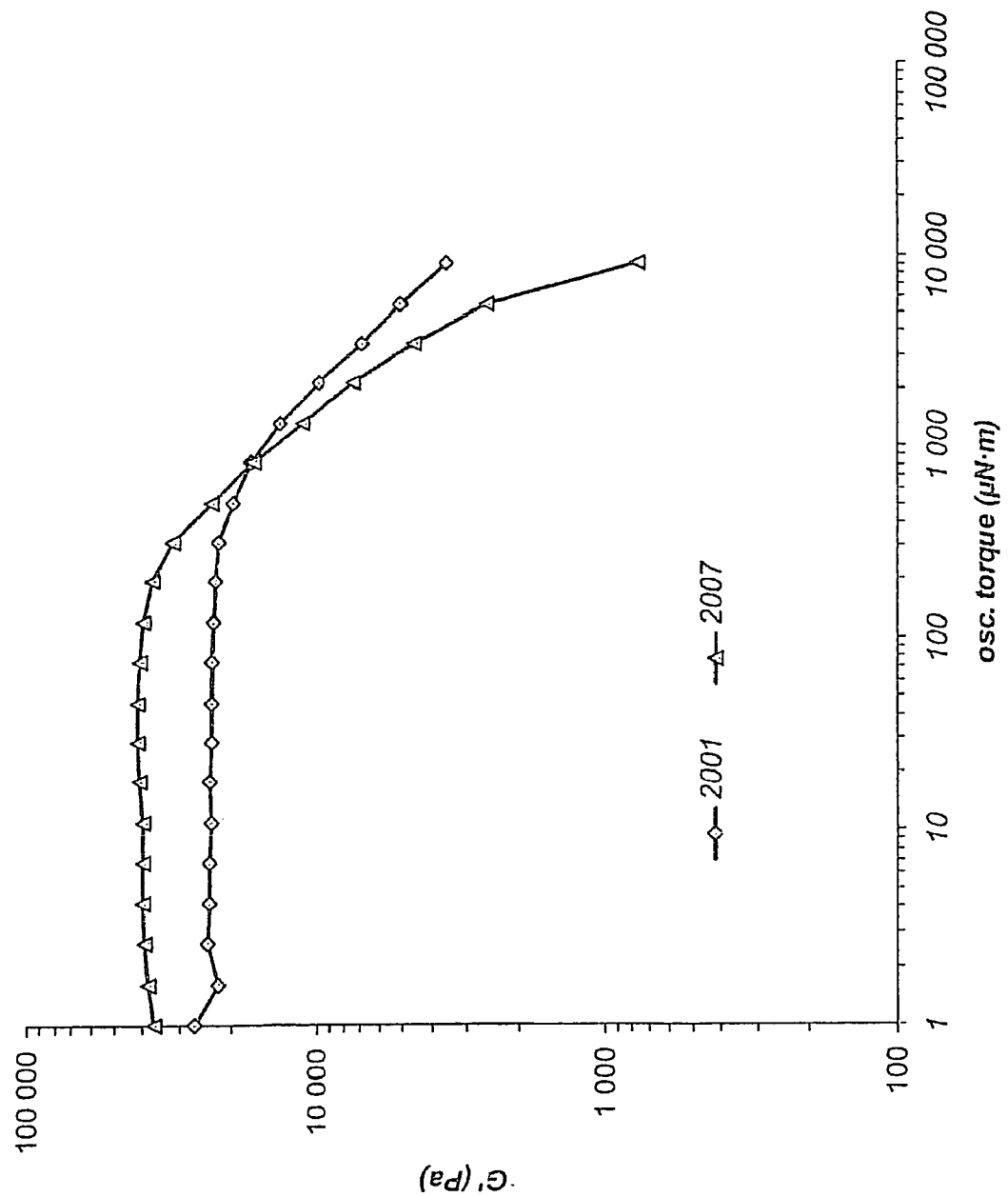

According to the invention, a chewing gum comprising at least two different biodegradable polymers exhibits an improved texture prior to any adding of for example softeners. It has been realized that the desired chewing gum texture properties, contrary to every expectation and any prior art disclosures, may actually be obtained when combining biodegradable chewing gum polymers, for example in the gum base or in the final gum.

47 Claims, 7 Drawing Sheets

FOREIGN PATENT DOCUMENTS

| | | |
|---|---|---|
| WO | WO 94/14331 | 7/1994 |
| WO | 2004028265 A1 | 8/1996 |
| WO | WO 00/19837 | 4/2000 |
| WO | WO 00/25598 | 5/2000 |
| WO | WO 00/35296 | 6/2000 |
| WO | WO 00/35297 | 6/2000 |
| WO | WO 01/01788 | 1/2001 |
| WO | WO 01/47368 | 6/2001 |
| WO | WO 01/54512 | 8/2001 |
| WO | WO 02/051258 | 7/2002 |
| WO | WO 02/076227 | 10/2002 |
| WO | WO 02/076228 | 10/2002 |
| WO | WO 02/076229 | 10/2002 |
| WO | WO 02/076230 | 10/2002 |
| WO | WO 02/076231 | 10/2002 |
| WO | WO 02/076232 | 10/2002 |
| WO | 2004028266 A1 | 4/2004 |
| WO | 2004028267 A1 | 4/2004 |
| WO | 2004028268 A1 | 4/2004 |
| WO | 2004028269 A1 | 4/2004 |
| WO | 2004028270 A1 | 4/2004 |
| WO | WO 2004/028269 | 4/2004 |
| WO | WO 2004/068965 | 4/2004 |
| WO | WO 2004/028265 | 8/2004 |
| WO | WO 2004/028266 | 8/2004 |
| WO | WO 2004/028267 | 8/2004 |
| WO | WO 2004/028268 | 8/2004 |
| WO | WO 2004/068964 | 8/2004 |

OTHER PUBLICATIONS

Ching, Chauncey, et al.; "Biodegradable Polymers and Packaging", Biodegradable Polymers and Packaging, (1993): p. 28-31.

Grijpma, Dirk W., et al., "(Co)polymers of L-lactide, 1" Macromolecules Chem. Phys. (1993): p. 1633-1647.

JP48-19950; Jun. 18, 1973; Translation (10 pages).

J. Dent. Res. vol. 28, No. 2; pp. 160-171; Apr. 1949.

U.S. Appl. No. 10/528,926, filed Dec. 16, 2005; Andersen et al.; "Chewing gum comprising at least two different biodegradable polymers" (available in IFW).

U.S. Appl. No. 10/528,927, filed Dec. 16, 2006; Andersen et al.; "Biodegradable chewing gum comprising at least one high molecular weight biodegradable polymer" (available in IFW).

U.S. Appl. No. 10/529,137, filed Sep. 6, 2005; Andersen et al; "Gum base" (available in IFW).

Fiedler, H.P., Lexikon der Hilfstoffe für Pharmacie, Kosmetik and Angrenzende Gebiete (1981) pp. 63-64.

Preliminary Examination Report dated Jan. 26, 2005 for Application No. PCT/DK2002/00626.

CHEWING GUM COMPRISING AT LEAST TWO DIFFERENT BIODEGRADABLE POLYMERS

CROSS-REFERENCE TO RELATED APPLICATIONS

This application is a continuation application of International Application No. PCT/DK2003/000626 filed Sep. 24, 2003 and a continuation application of International Application No. PCT/DK2002/00627 filed Sep. 24, 2002, both of which are incorporated herein in their entirety.

FIELD OF THE INVENTION

The invention relates to a chewing gum comprising at least two different biodegradable polyester polymers.

BACKGROUND OF THE INVENTION

Softeners are small-molecular structures typically applied for the purpose of modifying the texture of the elastomer applied in the chewing gum. A problem when applying softeners to biodegradable polymers is that too extensive use may result in dissolving the polymer before the desired texture is reached.

It is the object of the invention to provide a chewing gum having certain desired texture without dissolving the overall chewing gum structure when adjusting the texture.

It is a further object of the invention to obtain a completely biodegradable chewing gum having a texture comparable to conventional chewing gum.

According to the prior art, a great significance has been made out of glass transition temperature of chewing gum. Especially, when dealing with biodegradable chewing gum.

The glass transition temperature Tg can loosely be defined as the temperature where a polymer undergoes a significant change in properties. The Tg is where a polymer structure turns "rubbery" upon heating and "glassy" upon cooling. Tg is regarded as a so-called second order transition, i.e. a thermal transition that involves a change in heat capacity, but does not have a latent heat.

According to the prior art within the field of chewing gum, e.g. as disclosed in WO 00/19837 and U.S. Pat. No. 5,672,367 great efforts have been made in obtaining a glass transition temperature of the applied chewing gum below about 37° C. In other words, the user of a chewing gum should be able to change the conditions of a chewing gum from below the glass transition temperature to above the glass transition temperature, when the chewing gum in chewed and in fact heated in the mouth.

On the other hand, as it generally applies to chewing gum and e.g. disclosed in U.S. Pat. No. 5,523,098, the glass transition temperature of the chewing gum should not lay significantly below reasonably expected storage temperature, e.g. 10 degrees to 12 degrees C. For this reason a significant effort has been made in order to counteract the expected increase to prevent blocking. Such shipping and storage temperatures are stated to be non-cost-effective. In fact such temperatures may not be possible when shipping in, or to, certain locations. Thus, it is stated in U.S. Pat. No. 5,523,098 that cold flow causes independent gum base pellets or slabs to join or fuse together so that individual slabs or pellets cannot be removed from their container or carton. Pelletized or slab-poured gum base that is stored or shipped at temperatures above its glass transition temperature can deform. Subjected to gravitational forces, these slabs or pellets agglomerate or mass together with other pellets or slabs.

This requirement is reflected in both WO 00/19837 and U.S. Pat. No. 5,672,367 where a biodegradable chewing gum is disclosed comprising one single polymer having a relatively high glass temperature.

However, a drawback of the prior art biodegradable chewing gum is that the biodegradable elastomer polymers by nature perform somewhat different than conventional elastomers. According to the prior art, these deviating properties have dealt with by focussing strictly on keeping the glass transition temperature of the resulting chewing gum below or about 37° C. whereby the desired properties would be obtained.

However, a drawback of the above-described chewing gums is that the final obtainable texture may differ from that of conventional chewing gum.

It is an object of the invention to obtain a biodegradable chewing gum having a texture comparable to conventional chewing gum.

It is an object of the invention to provide both a biodegradable chewing gum that may actually be shipped and distributed under normal or at least substantially conventional chewing gum distribution parameters and on the other hand exhibit an acceptable texture, when applied as a chewing gum.

SUMMARY OF THE INVENTION

The invention relates to a chewing gum comprising at least two different biodegradable polymers wherein at least one of said biodegradable polymers comprises a polyester polymer.

According to the invention, a chewing gum comprising at least two different biodegradable polymers exhibits an improved texture prior to any adding of for example softeners. It has been realized that the desired chewing gum texture properties, contrary to every expectation and any prior art disclosures, may actually be obtained when combining biodegradable chewing gum polymers, for example in the gum base or in the final gum.

The fact that biodegradable polymers may actually be configured into a suitable polymer gum base, e.g. at least one biodegradable elastomer and at least one biodegradable synthetic resin substitute, facilitate the possibility of providing a completely biodegradable chewing gum.

According to an embodiment of the invention, a chewing gum should preferably comprise different biodegradable polymers in order to enable a uniform or a certain desired release profile over time.

According to an embodiment of the invention, it has been realized that chewing gum made on the basis of biodegradable polymers features an improved release of flavors, active ingredients or for example sweeteners when compared to release in chewing gums made on a conventional basis. Specifically, it has been established that different biodegradable polymers typically result in very different release properties during the complete chewing phase when compared to conventional chewing gum Moreover, according to the invention, it has been established that the different release profiles may in fact be sort of super positioned in order to obtain a desired release profile.

In an embodiment of the invention, at least one of said at least two different biodegradable polymers comprises at least one biodegradable elastomer, and at least one of said at least two different biodegradable polymers comprises at least one biodegradable elastomer plasticizer, said biodegradable plasticizer comprising at least one biodegradable polymer.

According to a preferred embodiment of the invention it has been realized that it is in fact possible to pair a biodegradable polymer plasticizer with an elastomer without compromising the desire for non-tack. Moreover, it has been realized that improved texture may be obtained by incorporation of biodegradable plasticizers in a chewing gum or the gum base.

Further significant chewing gum characteristics may also be improved compared to conventional biodegradable single or dual elastomer system.

A group of elastomer plasticizers is often functionally referred to as synthetic or natural resins within the art. Therefore, according to the terminology applied for the purpose of describing the invention, the term resin may refer broadly to the elastomer plasticizing function, unless specific reference to named resin types are mentioned.

In an embodiment of the invention, at least one of said at least two different biodegradable polymers comprises a polyester produced through reaction of at least one alcohol or derivative thereof and at least one acid or derivative thereof.

According to a preferred embodiment of the invention, at least one of the polymers is produced through reaction of at least one alcohol and at least one acid. This type of polymer features advantageous properties when applied in chewing gum or gum base, both with respect to processing and the finally obtained texture.

In an embodiment of the invention, said alcohol derivative comprises an ester of an alcohol.

For the purpose of illustration and not limitation some examples of alcohol derivatives include triacetin, glycerol palmitate, glycerol sebacate, glycerol adipate, tripropionin, etc. Typically, derivatives of polyols are preferred although e.g. end capping may be applied by the use of monohydroxy alcohols.

In an embodiment of the invention, said acid derivative comprises esters, anhydrides or halides of carboxylic acids.

Polycondensations involving transesterification of the ester of a polyfunctional acid is often the preferred process. For example, the dimethyl ester of terephthalic acid might be used instead of terephthalic acid itself. In this case, methanol rather than water is condensed, and the former can be driven off more easily than water.

In an embodiment of the invention, said acid derivative comprises methyl esters of acids.

In an embodiment of the invention, said alcohols or derivatives thereof comprise polyols.

One of several features of applying polyols, i.e. multifunctional alcohols is to facilitate branching of the monomer chains.

In an embodiment of the invention, said acids or derivatives thereof comprise polyfunctional carboxylic acids.

In an embodiment of the invention, said at least one biodegradable polymer produced through reaction of at least one alcohol or derivative thereof and at least one acid or derivative thereof has a PD of 1.1 to 20, preferably 1.3 to 12.

According to a preferred embodiment of the invention, PD is ranging relatively high, especially when dealing with elastomers where a high degree of elasticity is desired. PD refers to polydispersity. In this context it is noted that PD may be adjusted when taking the molecular weight into consideration. A relatively low molecular weight Mn of a polymer may be compensated for by a relatively high PD or vice versa.

In an embodiment of the invention, at least one of said at least two different biodegradable polymers comprises a polyester obtained by polymerization of at least one cyclic ester.

According to a preferred embodiment of the invention, the polyester obtained by polymerization of at least one cyclic ester comprises no or few aromatic groups as the polymerization typically involves ring opening. Thus, such a polymer is typically aliphatic, thereby featuring easy hydrolysable bonds and thereby high degree of biodegradability.

In an embodiment of the invention, said polyester obtained by polymerization of at least one cyclic ester is at least partly derived from α-hydroxy acids such as lactic and glycolic acids.

According to an embodiment of the invention at least one of the applied polyester polymers are derived from α-hydroxy acids such as lactic and glycolic acids. The obtained ester linkages, due to their chemical structure, are very susceptible to hydrolysis, and because these acids are natural metabolites, their esters are susceptible to a large variety of enzymatic degradation mechanisms, by the human body, animal bodies and bacteria.

In an embodiment of the invention, said polyester obtained by polymerization of at least one cyclic ester is at least partly derived from α-hydroxy acids and where the obtained polyester comprises at least 20 mole % α-hydroxy acids units, preferably at least 50 mole % α-hydroxy acids units and most preferably at least 80 mole % α-hydroxy acids units According to a preferred embodiment of the invention, the chewing gum comprises an elastomer plasticizer comprising more then 90 mole % α-hydroxy acids, e.g. lactic acid units.

In an embodiment of the invention, at least two or more cyclic esters are selected from the groups of glycolides, lactides, lactones, cyclic carbonates or mixtures thereof.

In an embodiment of the invention, lactone monomers are chosen from the group of ε-caprolactone, δ-valerolactone, y-butyrolactone, and β-propiolactone. It also includes ε-caprolactones, δ-valerolactones, y-butyrolactones, or β-propiolactones that have been substituted with one or more alkyl or aryl substituents at any non-carbonyl carbon atoms along the ring, including compounds in which two substituents are contained on the same carbon atom.

In an embodiment of the invention carbonate monomer is selected from the group of trimethylene carbonate, 5-alkyl-1,3-dioxan-2-one, 5,5-dialkyl-1,3-dioxan-2-one, or 5-alkyl-5-alkyloxycarbonyl-1,3-dioxan-2-one, ethylene carbonate, 3-ethyl-3-hydroxymethyl, propylene carbonate, trimethylolpropane monocarbonate, 4,6dimethyl-1,3-propylene carbonate, 2,2-dimethyl trimethylene carbonate, and 1,3-dioxepan-2-one and mixtures thereof.

In an embodiment of the invention, cyclic ester polymers and their copolymers resulting from the polymerization of cyclic ester monomers include, but are not limited to: poly (L-lactide); poly (D-lactide); poly (D, L-lactide); poly (meso-lactide); poly (glycolide); poly (trimethylenecarbonate); poly (epsilon-caprolactone); poly (L-lactide-co-D, L-lactide); poly (L-lactide-co-meso-lactide); poly (L-lactide-co-glycolide); poly (L-lactide-co-trimethylenecarbonate); poly (L-lactide-co-epsilon-caprolactone); poly (D, L-lactide-co-meso-lactide); poly (D, L-lactide-co-glycolide); poly (D, L-lactide-co-trimethylenecarbonate); poly (D, L-lactide-co-epsilon-caprolactone); poly (meso-lactide-co-glycolide); poly (meso-lactide-co-trimethylenecarbonate); poly (meso-lactide-co-epsilon-caprolactone); poly (glycolide-cotrimethylenecarbonate); poly (glycolide-co-epsilon-caprolactone).

In an embodiment of the invention, said polyester obtained by polymerization of at least one cyclic ester has a PD of 1.1 to 15, preferably 1.3 to 9.

According to a preferred embodiment of the invention, PD is ranging relatively high, especially when dealing with elastomers, where a high degree of elasticity is desired. In this context it is noted that PD may be adjusted when taking the molecular weight into consideration. A relatively low molecular weight Mn of a polymer may be compensated for by a relatively high PD or vice versa.

In an embodiment of the invention, at least one of said biodegradable elastomers comprises said polyester produced through reaction of at least one alcohol or derivative thereof and at least one acid or derivative thereof.

According to an embodiment of the invention, polyester produced through reaction of at least one alcohol or derivative thereof and at least one acid or derivative thereof inherits advantageous release with respect to long-term release of chewing gum ingredients, e.g. flavoring, etc.

In an embodiment of the invention, said elastomer is produced through reaction of at least one acid chosen from terephthalic, phthalic, adipic, pimelic acids or combinations thereof with at least one alcohol chosen from the groups of diethylene and 1,4-butylene diols or combinations thereof.

In an embodiment of the invention, said at least one biodegradable elastomer produced through reaction of at least one alcohol or derivative thereof and at least one acid or derivative thereof has a molecular weight of 10000-250000 g/mol (Mn), preferably 20000-150000 g/mol (Mn).

In an embodiment of the invention, at least one of said biodegradable elastomer plasticizers comprises said polyester produced through reaction of at least one alcohol or derivative thereof and at least one acid or derivative thereof.

In an embodiment of the invention, said resin is produced through reaction of at least one acid chosen from terephthalic, succinic, malonic and adipic acids or combinations thereof with at least one alcohol chosen from ethylene, diethylene or 1,4-butylene diols and combinations thereof.

In an embodiment of the invention, said at least one biodegradable elastomer plasticizer produced through reaction of at least one alcohol or derivative thereof and at least one acid or derivative thereof has a molecular weight of 500-19000 g/mol (Mn), preferably 1500-9000 g/mol (Mn).

In an embodiment of the invention, at least one of said biodegradable elastomers comprises said polyester obtained by polymerization of at least one cyclic ester.

In an embodiment of the invention, the molecular weight of said biodegradable elastomer is within the range of 10000-1000000 g/mol Mn, preferably within the range of 30000-250000 g/mol Mn.

In an embodiment of the invention, at least one of said biodegradable elastomer plasticizers comprises said polyester obtained by polymerization of at least one cyclic ester.

In an embodiment of the invention, said chewing gum comprises at least one elastomer plasticizer comprising at least one of said polyesters obtained by polymerization of at least one cyclic ester and at least one elastomer comprising at least one of said polyesters produced through reaction of at least one alcohol or derivative thereof and at least one acid or derivative thereof.

An advantage of mixing the two types of polymers together is that the high degree of degradability offered by the biodegradable polymers applied as elastomer plasticizers may be combined with advantageous properties of the biodegradable elastomer with respect to robustness with respect to added softeners, etc., texture, release and process-ability.

In an embodiment of the invention, the at least two different polymers are hydrophilic.

It should be noted that the degree of hydrophilic behavior of the polymer might vary quite significantly from polymer to polymer. It is, however, a general fact that the biodegradable polymers are more hydrophilic than conventional polymers.

Typical biodegradable polymers are relatively hydrophilic.

In an embodiment of the invention, the difference in molecular weight between the at least two different polymers is at least 1000 g/mol Mn.

According to an advantageous embodiment of the invention, the molecular weight of the applied different polymers should differ to a certain degree, preferably at least 1000 g/mol Mn in order to obtain the desired texture properties. Apparently, the plasticizing effect of the plasticizing polymer(s) on the polymer(s) to be plasticized decreases if the molecular weight becomes too equal.

When applying relatively significant differences in molecular weight between the applied biodegradable polymers, an increased possibility of tuning with respect to both texture and for instance chewing gum release has been obtained.

According to the prior art, attempts have been made within the field of biodegradable chewing gum to provide a chewing gum having texture properties comparable to the texture properties of conventional chewing gum. According to e.g. U.S. Pat. No. 6,153,231, it has been realized that chewing gum made on the basis of biodegradable elastomers should preferably be made on the basis of an elastomer, thereby eliminating the annoying tackiness established by conventional plasticizers. According to an embodiment of the invention, the desired texture of biodegradable chewing gum may be obtained by the plasticizing of a biodegradable polyester plasticizer on a biodegradable polyester elastomer in an advantageous way if the properties of the polyesters are substantially maintained with respect to certain properties even after mixing the final gum base or chewing gum. This aspect is according to an embodiment of the invention particular of interest with respect to Tg. It has thus been established that the Tg's of the individual polyester may be maintained even in a multicomponent system, thereby offering a multiple polymer system comprising a desired multi-functionality with respect to cold-floating properties. Thus, when mixing for example two different polyesters into a gum base or chewing gum, Tg's of both polymers have been found to be substantially unchanged.

In an embodiment of the invention, the difference in molecular weight between the at least two different polymers is at least 20000 g/mol Mn or at least 50000 g/mol Mn.

In an embodiment of the invention, the molecular weight of said biodegradable plasticizer is in the range of 500-19000 g/mol, preferably within the range of 1500-9000 g/mol Mn.

In an embodiment of the invention, said at least two different biodegradable polymers have a different glass transition temperature Tg.

According to an embodiment of the invention, it has been realized that biodegradable chewing gum having a texture comparable to conventional chewing gum may be obtained, when at least two of the applied biodegradable polymers have different glass transition temperatures. In other words, the applied biodegradable polymers form a hybrid polymer gum base or chewing gum having at least two different properties with respect to the glass transition temperature.

According to an embodiment of the invention, at least one of the applied biodegradable polymers may be applied for counteracting cold floating of the gum base or the final chewing gum and at least one of the other polymers may be applied for obtaining desired chewing gum properties with respect to texture.

In other words, according to the invention, it has been realized that the expected requirements with respect to the applied biodegradable polymers of a chewing gum may be significantly loosened when applying more polymers according to the invention.

Hence, according to an embodiment of the invention, the important issue of facilitating shipping of the final product with respect to cold floating may even, and unexpectedly, be dealt with by means of at least one stabilizing biodegradable polymers, e.g. a biodegradable polymer having a relatively high glass transition temperature mixed with a further biodegradable polymer featuring another glass temperature than the stabilizing polymers. Typically, the at least one further biodegradable polymer may be chosen by e.g. an elastomer having a relatively low glass transition temperature.

Moreover, according to an embodiment of the invention, it has been realized that biodegradable polymers, when incorporated in a gum base or chewing gum composition, react somewhat vulnerable compared to conventional polymers and it has moreover been realized that this vulnerability to softeners may be compensated for when applying texture improving mixtures of at least two polymers having different glass transition temperatures. Hence, the need for structure weakening softeners may be reduced due to the fact, that the texture is improved when compared to single Tg polymer blends of chewing gum.

In an embodiment of the invention said at least two different biodegradable polymers having a different glass transition temperature Tg.

According to the invention, at least one of the applied biodegradable polymers may be applied for counteracting cold floating of the gum base or the final chewing gum and at least one of the other may be applied for obtaining the desired chewing gum properties with respect to texture.

The one applied for the purpose of counteracting floating should preferably be relatively high, whereas the other, providing the advantageous texture, should preferably be relatively low, typically substantially lower than room temperature.

According to the invention, it has been realized that the desired texture properties may be obtained when the mixed chewing gum elastomer and elastomer solvents comprise at least two different Tg's.

In an embodiment of the invention, at least one of the applied biodegradable polymers, preferably a plasticizer has a glass transition of at least $+1°$ C., preferably at least $+10°$ C. and more preferably at least $+20°$ C.

In an embodiment of the invention, at least one of the at least two different biodegradable polymers has a glass transition temperature of less than $0°$ C., preferably less than $-30°$ C. and more preferably less than $-50°$ C.

In an embodiment of the invention, the resulting chewing gum has at least two different glass transition temperatures Tg.

According to an advantageous embodiment of the invention, a gum base or a chewing gum prepared according to the invention has at least two different glass transition temperatures, thereby featuring a polymer system comprising at least two different biodegradable polymers which are not completely mixed by complete dissolving but rather featuring a mix of polymers having properties of both the at least two polymers. Thereby, advantageous properties of the resulting chewing gum have been obtained, especially with respect to texture.

In an embodiment of the invention, the chewing gum comprises at least one biodegradable elastomer having a glass transition temperature Tg below $0°$ C. and at least one biodegradable plasticizer having a glass transition temperature Tg exceeding $0°$ C.

In an embodiment of the invention, said chewing gum comprises at least one biodegradable elastomer in the amount of about 0.5 to about 70% by weight of the chewing gum, at least one biodegradable plasticizer in the amount of about 0.5 to about 70% by weight of the chewing gum and at least one chewing gum ingredient chosen from the groups of softeners, sweeteners, flavoring agents, active ingredients and fillers in the amount of about 2 to about 80% by weight of the chewing gum.

In an embodiment of the invention, all the biodegradable polymers comprised in the chewing gum comprise at least 25%, preferably at least 50% of the chewing gum polymers.

In an embodiment of the invention, all the biodegradable polymers comprised in the chewing gum comprise at least 80%, preferably at least 90% of the chewing gum polymers.

In an embodiment of the invention, the chewing gum is substantially free of non-biodegradable polymers.

Preferably, the chewing gum is free of non-biodegradable polymers.

In an embodiment of the invention, said chewing gum ingredients comprise flavoring agents.

In an embodiment of the invention, said chewing gum comprises flavor in the amount of 0.01 to about 30% by weight, said percentage being based on the total weight of the chewing gum, preferably 0.2 to about 4% by weight, said percentage being based on the total weight of the chewing gum.

In an embodiment of the invention, said chewing gum ingredients comprise sweeteners.

In an embodiment of the invention, the chewing gum comprises bulk sweeteners in the amount of about 5 to about 95% by weight of the chewing gum, more typically about 20 to about 80% by weight of the chewing gum.

In an embodiment of the invention, the chewing gum comprises high intensity sweeteners in the amount of about 0 to about 3% by weight of the chewing gum, more typically about 0.05 to about 0.5% by weight of the chewing gum.

In an embodiment of the invention, the chewing gum comprises at least one softener in the amount of about 0 to about 18% by weight of the chewing gum, more typically about 0 to about 12% by weight of the chewing gum.

In an embodiment of the invention, said chewing gum ingredients comprise active ingredients.

In an embodiment of the invention, the chewing gum comprises filler in an amount of about 0 to about 50% by weight of the chewing gum, preferably about 10 to about 40% by weight of the chewing gum.

In an embodiment of the invention, the chewing gum comprises at least one coloring agent.

In an embodiment of the invention, the chewing gum is coated with an outer coating.

According to an embodiment of the invention, said chewing gum comprises conventional chewing gum polymers and/or elastomer plasticizer.

According to an embodiment of the invention, the at least one biodegradable polymer comprises at least 5% of the chewing gum polymers.

DRAWINGS

The invention will now be described with reference to the drawings of which

Figure 2:
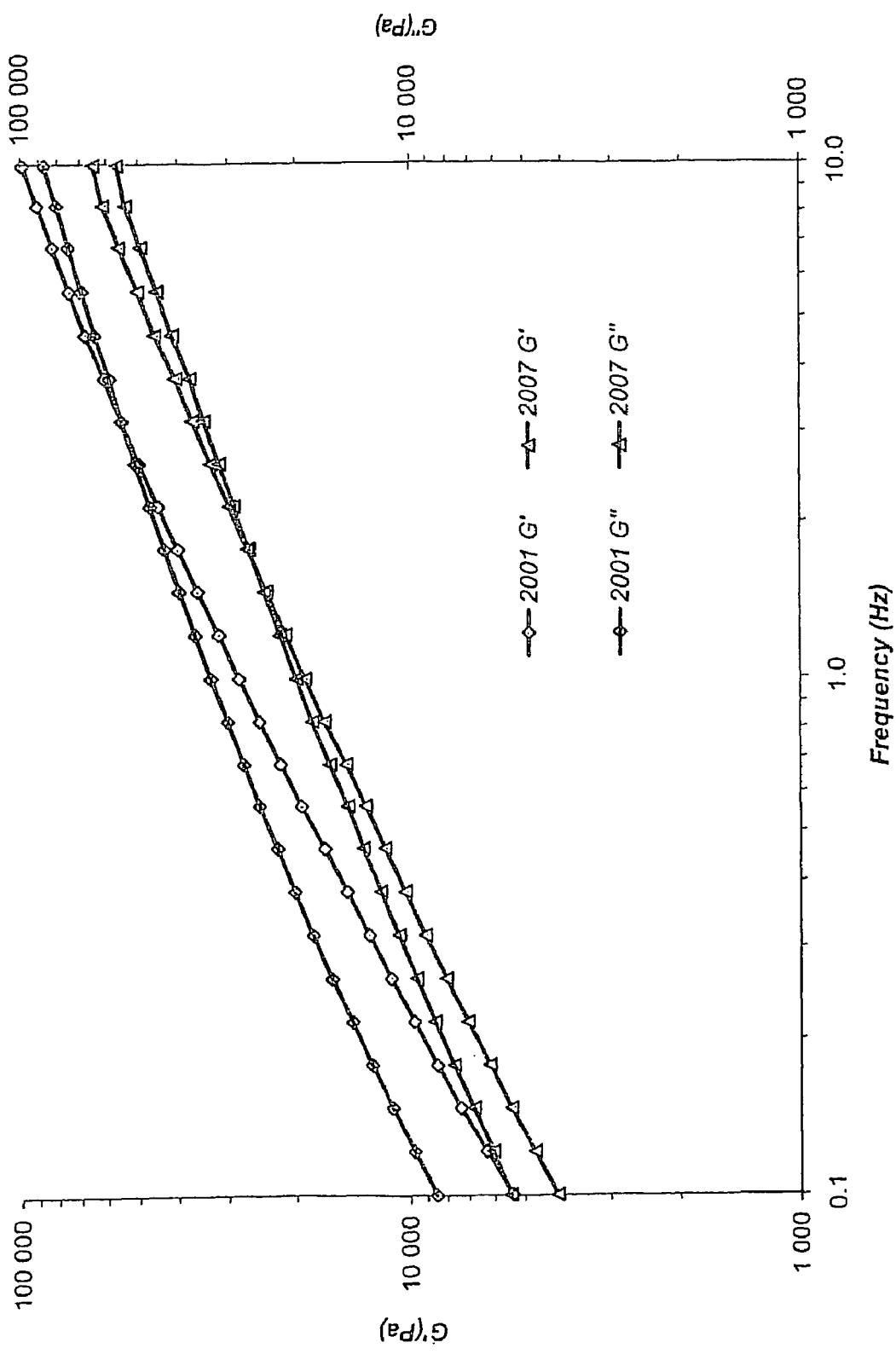
Figure 3:
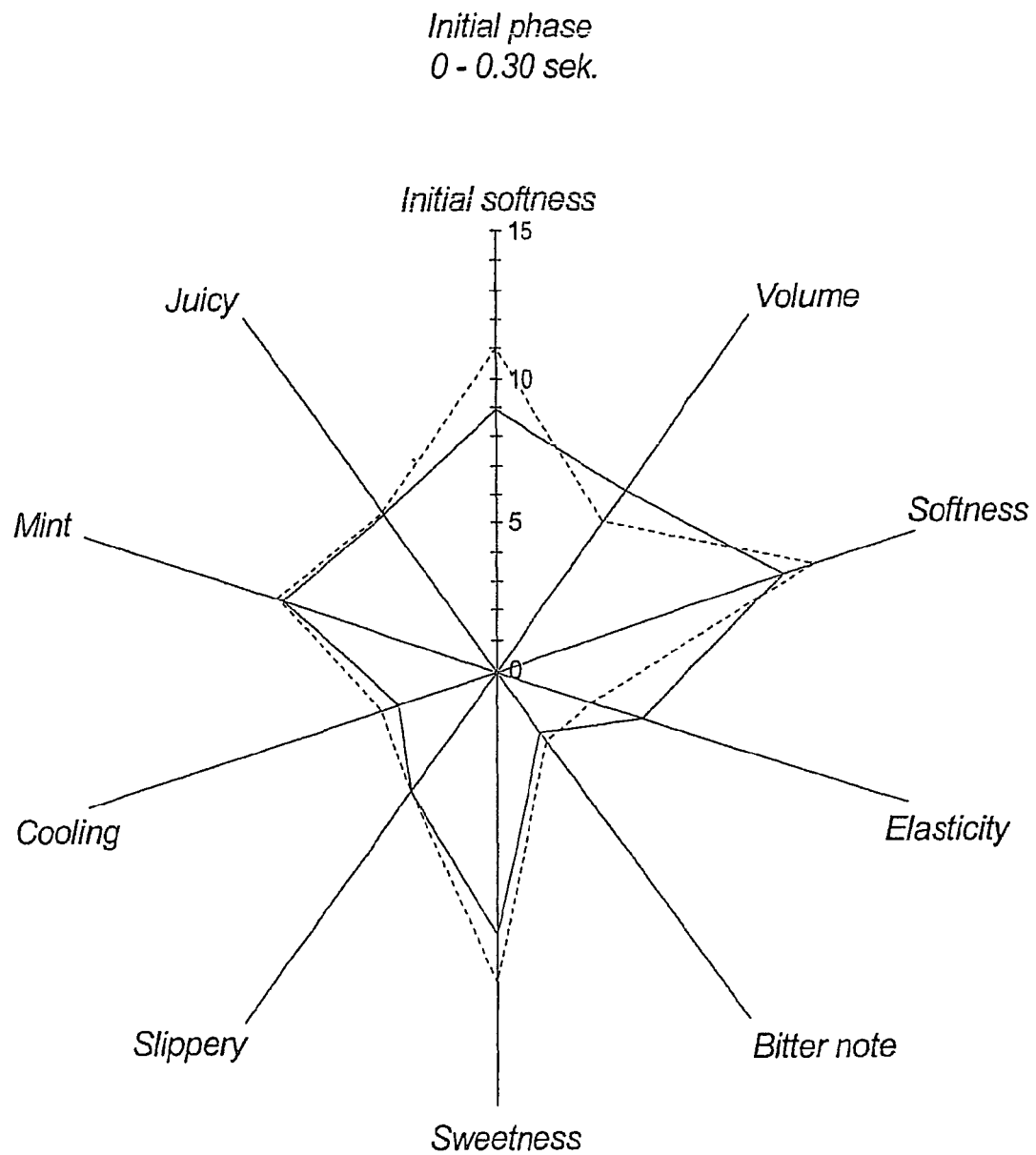
Figure 4:
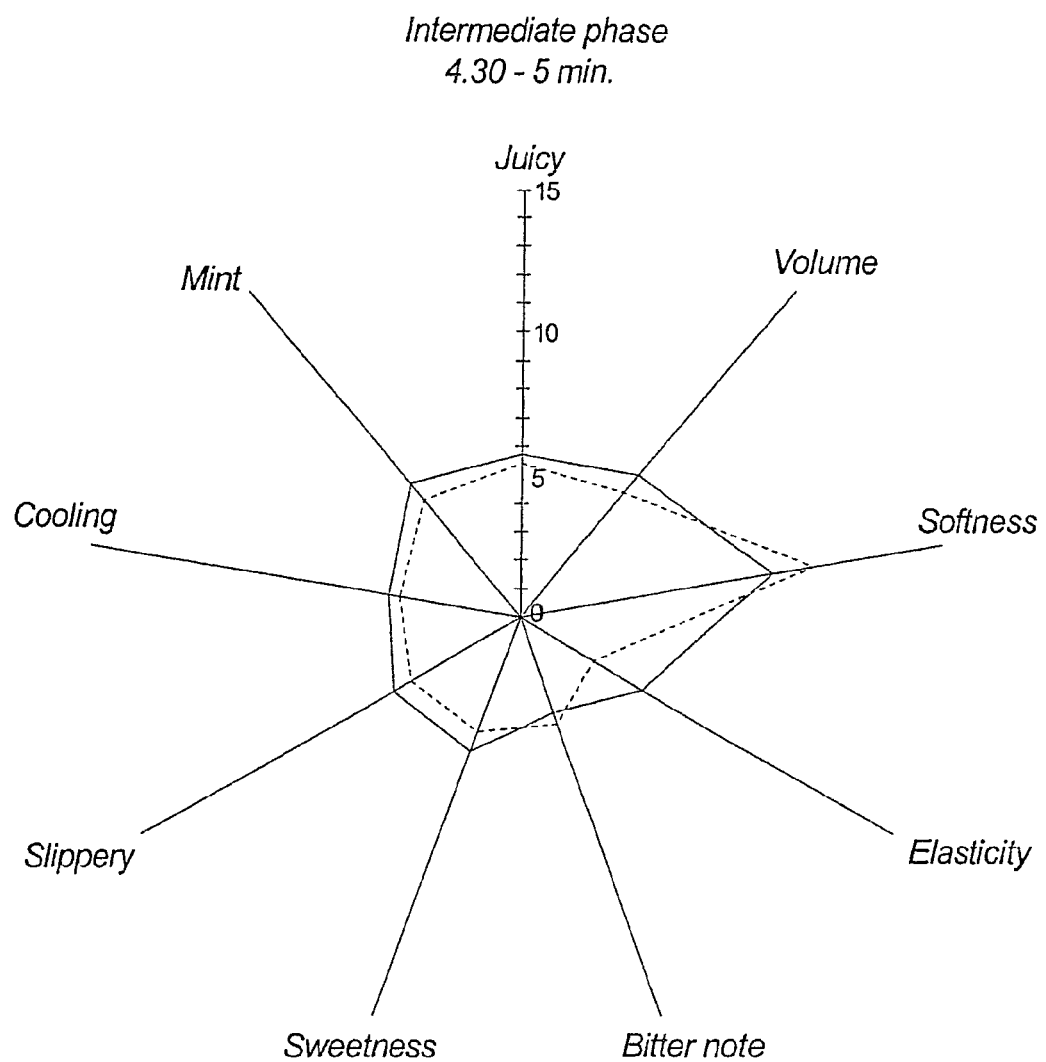
Figure 5:
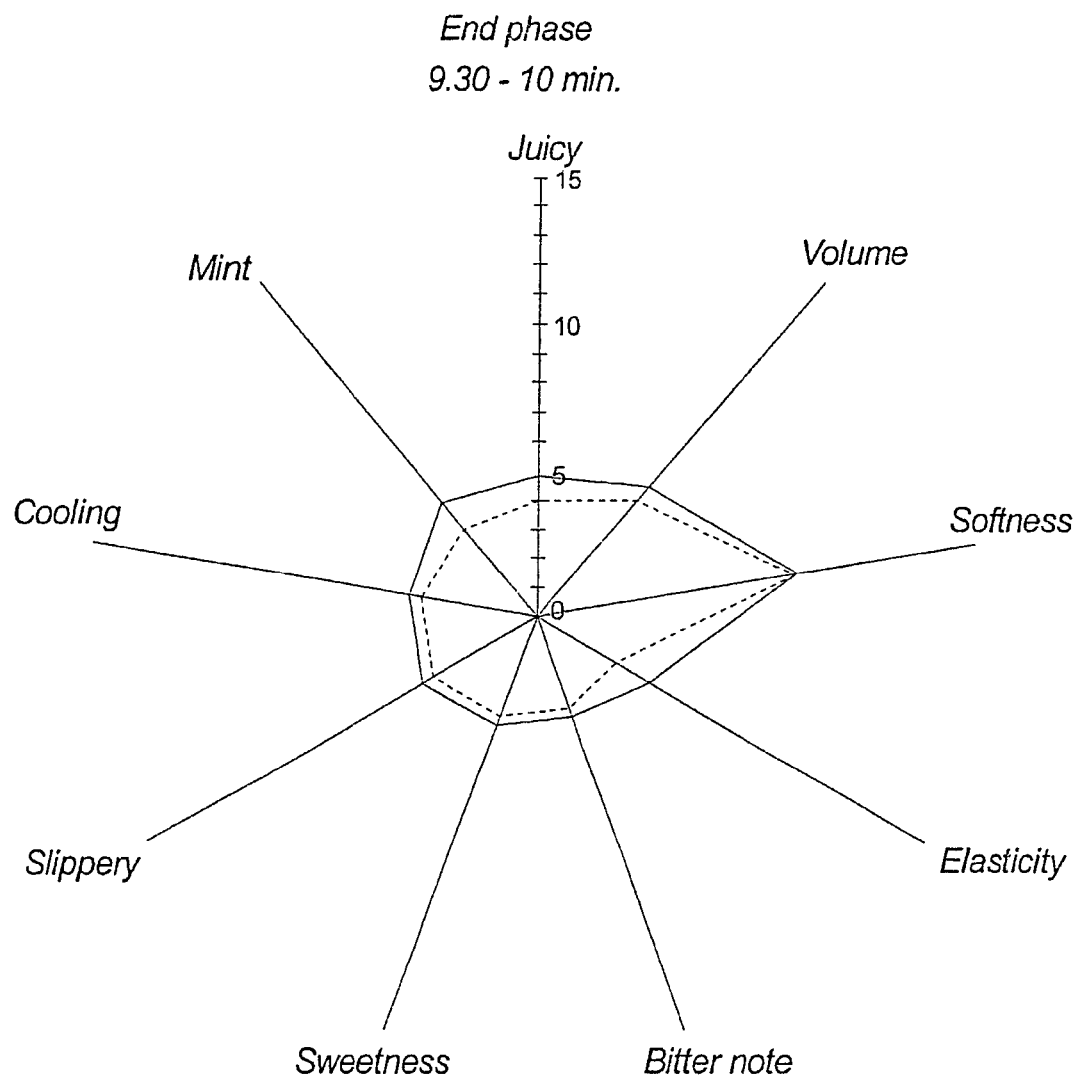
Figure 6:
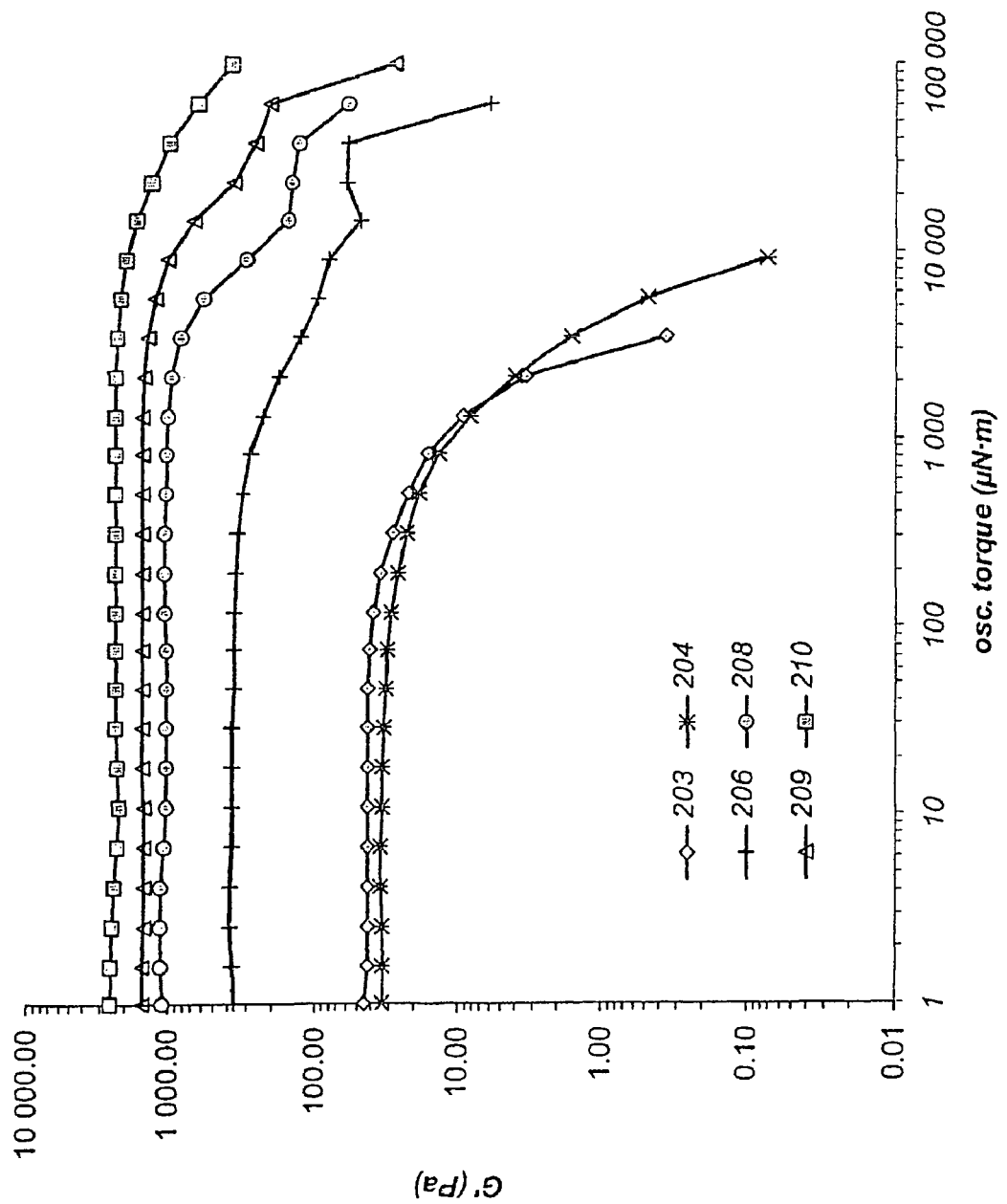
Figure 7:
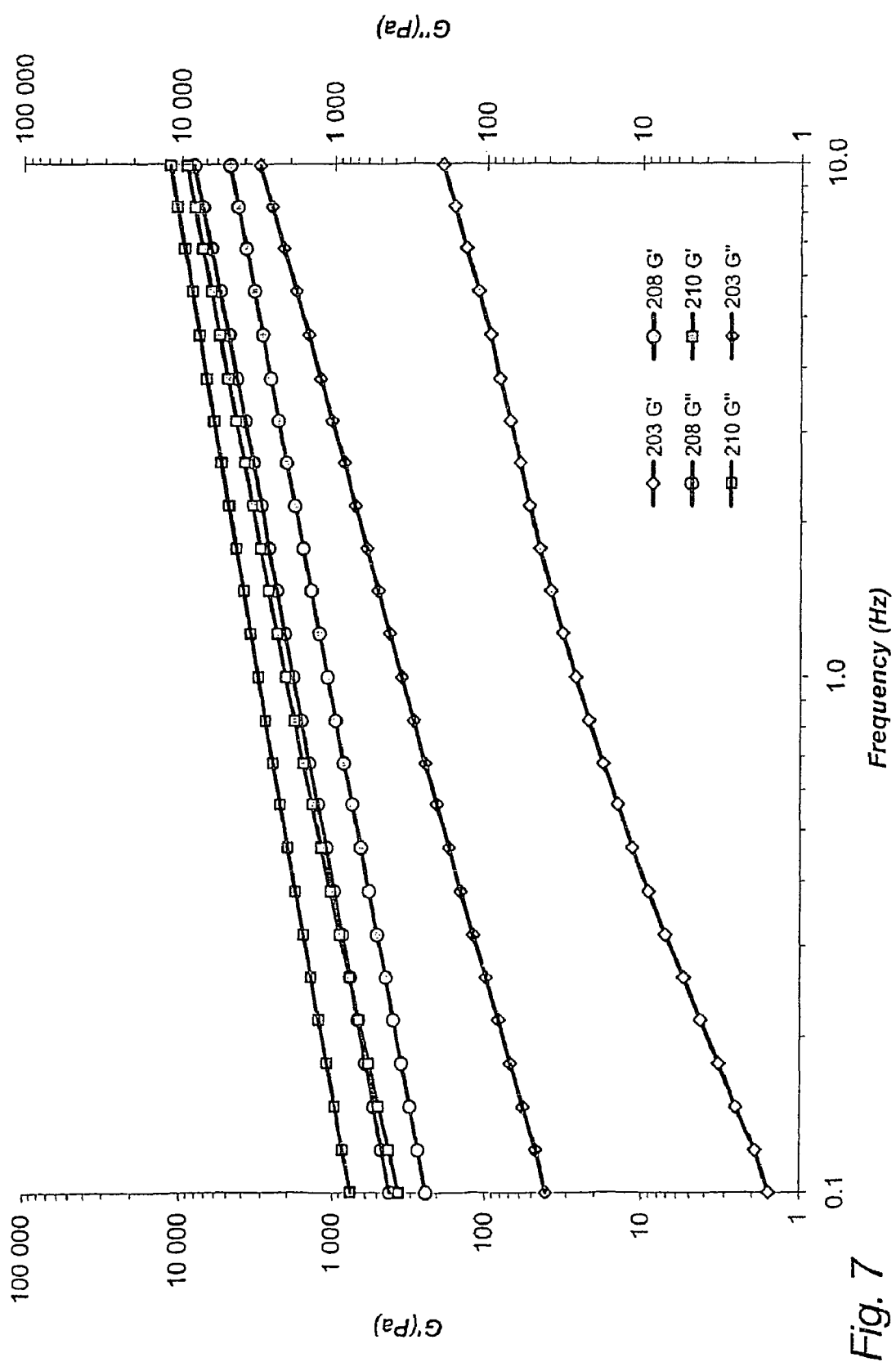

FIGS. 1 and 2 illustrate rheological properties of chewing gum according to the invention FIG. 3 to 5 illustrate sensory texture profile of the chewing gum according to the invention and FIGS. 6 and 7 illustrate stress sweep and frequency sweep of different gum bases made according to the invention.

DETAILED DESCRIPTION

Unless otherwise indicated, as used herein, the term "molecular weight" means number average molecular weight (Mn). The short form PD designates the polydispersity.

The glass transition temperature may be determined by for example DSC (DSC: differential scanning calorimetry). The DSC may generally be applied for determining and studying of the thermal transitions of a polymer and specifically, the technique may be applied for the determination of a second order transition of a material, i.e. a thermal transition that involves a change in heat capacity, but does not have a latent heat. The glass transition is a second-order transition.

Generally, in the following examples of the detailed description two different types of polymers may be referred to as polyester type 1 and polyester type 2. The polyester type 1 generally refers to a polyester produced through reaction of at least one alcohol or derivative thereof and at least one acid or derivative thereof. Further specification of this type of polyester polymers is given in the specification and claims. The polyester type 2 generally refers to a polyester polymer obtained by polymerization of at least one cyclic ester. Further specification of this type of polyester polymers is given in the specification and claims.

In the present context, the terms environmentally or biologically degradable polymer compounds refer to chewing gum base components which, after dumping the chewing gum, are capable of undergoing a physical, chemical and/or biological degradation whereby the dumped chewing gum waste becomes more readily removable from the site of dumping or is eventually disintegrated to lumps or particles which are no longer recognizable as being chewing gum remnants. The degradation or disintegration of such degradable polymers can be effected or induced by physical factors such as temperature, light, moisture, by chemical factors such as hydrolysis caused by a change in pH or by the action of enzymes capable of degrading the polymers. In other useful embodiments all of the polymer components of the gum base are environmentally degradable or biodegradable polymers.

Preferably, the ultimate degradation products are carbon dioxide, methane and water.

According to a preferred definition of biodegradability according to the invention, biodegradability is a property of certain organic molecules whereby, when exposed to the natural environment or placed within a living organism, they react through an enzymatic or microbial process, often in combination with a pure chemical process such as hydrolysis, to form simpler compounds, and ultimately, carbon dioxide, nitrogen oxides, methane and water.

Accordingly, suitable examples of additional environmentally or biologically degradable chewing gum base polymers, which can be applied in accordance with the gum base of the present invention, include degradable polyesters, poly(ester-carbonates), polycarbonates, polyester amides, polypeptides, homopolymers of amino acids such as polylysine, and proteins including derivatives thereof such as e.g. protein hydrolysates including a zein hydrolysate. Particularly useful compounds of this type include polyester polymers obtained by the polymerisation of one or more cyclic esters such as lactide, glycolide, trimethylene carbonate, δ-valerolactone, β-propiolactone and ε-caprolactone, and polyesters obtained by polycondensation of a mixture of open-chain polyacids and polyols, for example, adipic acid and di(ethylene glycol). Hydroxy carboxylic acids such as 6-hydroxycaproic acid may also be used to form polyesters or they may be used in conjunction with mixtures of polyacids and polyols. Such degradable polymers may be homopolymers, copolymers or terpolymers, including graft- and block-polymers.

EXAMPLE 1

Preparation of Polyester Type 2 Resin

A resin sample is produced using a cylindrical glass, jacketed 10 L pilot reactor equipped with glass stir shaft and Teflon stir blades and bottom outlet. Heating of the reactor contents is accomplished by circulation of silicone oil, thermo stated to 130° C., through the outer jacket. ε-caprolactone (358.87 g, 3.145 mol) and 1,2-propylene glycol (79.87 g, 1.050 mol) are charged to the reactor together with stannous octoate (1.79 g, 4.42×10$^{-3}$ mol) as the catalyst and reacting in about 30 min. at 130° C. Then molten D,L-lactide (4.877 kg, 33.84 mol) are added and reaction continued for about 2 hours. At the end of this period, the bottom outlet is opened, and molten polymer is allowed to drain into a Teflon-lined paint can.

Characterization of the product indicates $M_n$=6,000 g/mol and $M_w$=7,000 g/mol (gel permeation chromatography with online MALLS detector) and Tg=25-30° C. (DSC, heating rate 10° C./min).

EXAMPLE 2

Preparation of Polyester Type 1 Resin

A resin (elastomer solvent) sample is produced using a 500 mL resin kettle equipped with an overhead stirrer, nitrogen gas inlet tube, thermometer, and distillation head for removal of methanol. To the kettle are charged 126.22 g (0.65 mole) dimethyl terephthalate, 51.15 g (0.35 mole) dimethyl succinate, 64.27 g (1.036 mole) ethylene glycol and 0.6 g calcium acetate monohydrate. Under nitrogen, the mixture is slowly heated with stirring until all components become molten (120-140° C.). Heating and stirring are continued and methanol is continuously distilled. The temperature slowly rises in the range 150-200° C. until the evolution of methanol ceases. Heating is discontinued and the content is allowed to cool to about 100° C. The reactor lid is removed and the molten polymer carefully poured into a receiving vessel.

Characterization of the product indicates $M_n$=5,000 g/mol and $M_w$=10,000 g/mol (gel permeation chromatography with online MALLS detector) and Tg=30° C. (DSC, heating rate 10° C./min).

EXAMPLE 3

Preparation of Polyester Type 2 Elastomer

An elastomer sample is synthesized within a dry $N_2$ glove box, as follows. Into a 500 mL resin kettle equipped with overhead mechanical stirrer, 0.73 g 1,2-propane diol (3.3 mL of a 22.0% (w/v) solution in methylene chloride) and 0.152 g Sn(Oct)$_2$ (3.56 ml of a 4.27% (w/v) solution in methylene chloride) are charged under dry $N_2$ gas purge. The methylene chloride is allowed to evaporate under the $N_2$ purge for 15 min. Then ε-caprolactone (300 g, 2.63 mol) and δ-valerolactone (215 g, 2.15 mol) are added. The resin kettle is submerged in a 130° C. constant temperature oil bath and stirred for 14 h. Subsequently the kettle is removed from the oil bath and allowed to cool at room temperature. The solid, elastic product is removed in small pieces using a knife, and placed into a plastic container.

Characterization of the product indicates $M_n$=60,000 g/mol and Mw=90,000 g/mol (gel permeation chromatography with online MALLS detector) and Tg=−70° C. (DSC, heating rate 10° C./min).

EXAMPLE 4

Preparation of Polyester Type 1 Elastomer

An elastomer sample is produced using a 500 mL resin kettle equipped with an overhead stirrer, nitrogen gas inlet tube, thermometer, and distillation head for removal of methanol. To the kettle are charged 83.50 g (0.43 mole) dimethyl terephthalate, 99.29 g (0.57 mole) dimethyl adipate, 106.60 g (1.005 mole) di(ethylene glycol) and 0.6 g calcium acetate monohydrate. Under nitrogen, the mixture is slowly heated with stirring until all components become molten (120-140° C.). Heating and stirring are continued and methanol is continuously distilled.

The temperature slowly rises in the range 150-200° C. until the evolution of methanol ceases. Heating is discontinued and the content is allowed to cool to about 100° C.

The reactor lid is removed and the molten polymer is carefully poured into a receiving vessel.

Characterization of the product indicates $M_n$=40,000 g/mol and $M_w$=1 90,000 g/mol (gel permeation chromatography with online MALLS detector) and Tg=−30° C. (DSC, heating rate 110° C./min).

Referring to the examples 2 and 4 regarding polyester type 1, polymers of this type may generally within the scope of the invention be prepared by step-growth polymerization of di-, tri- or higher-functional alcohols or esters thereof with di-, tri- or higher-functional aliphatic or aromatic carboxylic acids or esters thereof. Likewise, also hydroxy acids or anhydrides and halides of polyfunctional carboxylic acids may be used as monomers. The polymerization may involve direct polyesterification or transesterification and may be catalyzed. Use of branched monomers suppresses the crystallinity of the polyester polymers. Mixing of dissimilar monomer units along the chain also suppresses crystallinity. To control the reaction and the molecular weight of the resulting polymer it is possible to stop the polymer chains by addition of monofunctional alcohols or acids and/or to utilize a stoichiometric imbalance between acid groups and alcohol groups or derivatives of either. Also the adding of long chain aliphatic carboxylic acids or aromatic monocarboxylic acids may be used to control the degree of branching in the polymer and conversely multifunctional monomers are sometimes used to create branching. Moreover, following the polymerization monofunctional compounds may be used to end cap the free hydroxyl and carboxyl groups.

In general, polyfunctional carboxylic acids are high-melting solids that have very limited solubility in the polycondensation reaction medium. Often esters or anhydrides of the polyfunctional carboxylic acids are used to overcome this limitation. Polycondensations involving carboxylic acids or anhydrides produce water as the condensate, which requires high temperatures to be driven off. Thus, polycondensations involving transesterification of the ester of a polyfunctional acid are often the preferred process. For example, the dimethyl ester of terephthalic acid may be used instead of terephthalic acid itself. In this case, methanol rather than water is condensed, and the former can be driven off more easily than water. Usually, the reaction is carried out in the bulk (no solvent) and high temperatures and vacuum are used to remove the by-product and drive the reaction to completion. In addition to an ester or anhydride, a halide of the carboxylic acid may also be used under certain circumstances.

Usually, for preparation of polyesters type 1 the preferred polyfunctional carboxylic acids or derivatives thereof are either saturated or unsaturated aliphatic or aromatic and contain 2 to 100 carbon atoms and more preferably 4 to 18 carbon atoms. In the polymerization of polyester type 1 some applicable examples of carboxylic acids, which may be employed as such or as derivatives thereof, includes aliphatic polyfunctional carboxylic acids such as oxalic, malonic, citric, succinic, malic, tartaric, fumaric, maleic, glutaric, glutamic, adipic, glucaric, pimelic, suberic, azelaic, sebacic, dodecanedioic acid, etc. and cyclic aliphatic polyfunctional carboxylic acids such as cyclopropane dicarboxylic acid, cyclobutane dicarboxylic acid, cyclohexane dicarboxylic acid, etc. and aromatic polyfunctional carboxylic acids such as terephthalic, isophthalic, phthalic, trimellitic, pyromellitic and naphthalene 1,4-, 2,3-, 2,6-dicarboxylic acids and the like. For the purpose of illustration and not limitation, some examples of carboxylic acid derivatives include hydroxy acids such as 3-hydroxy propionic acid and 6-hydroxycaproic acid and anhydrides, halides or esters of acids, for example dimethyl or diethyl esters, corresponding to the already mentioned acids, which means esters such as dimethyl or diethyl oxalate, malonate, succinate, fumarate, maleate, glutarate, adipate, pimelate, suberate, azelate, sebacate, dodecanedioate, terephthalate, isophthalate, phthalate, etc. Generally speaking, methyl esters are sometimes more preferred than ethyl esters due to the fact that higher boiling alcohols are more difficult to remove than lower boiling alcohols.

Furthermore, the usually preferred polyfunctional alcohols contain 2 to 100 carbon atoms as for instance polyglycols and polyglycerols. In the polymerization process of polyester type 1 some applicable examples of alcohols, which may be employed as such or as derivatives thereof, includes polyols such as ethylene glycol, 1,2-propanediol, 1,3-propanediol, 1,3-butanediol, 1,4-butanediol, 1,6-hexanediol, diethylene glycol, 1,4-cyclohexanediol, 1,4-cyclohexanedimethanol, neopentyl glycol, glycerol, trimethylolpropane, pentaerythritol, sorbitol, mannitol, etc. For the purpose of illustration and not limitation, some examples of alcohol derivatives include triacetin, glycerol palmitate, glycerol sebacate, glycerol adipate, tripropionin, etc.

Additionally, with regard to polyester type 1 polymerization the chain-stoppers sometimes used are monofunctional compounds. They are preferably either monohydroxy alcohols containing 1-20 carbon atoms or monocarboxylic acids containing 2-26 carbon atoms. General examples are medium or long-chain fatty alcohols or acids, and specific examples include monohydroxy alcohols such as methanol, ethanol, butanol, hexanol, octanol, etc. and lauryl alcohol, myristyl alcohol, cetyl alcohol, stearyl alcohol, stearic alcohol, etc. and monocarboxylic acids such as acetic, lauric, myristic, palmitic, stearic, arachidic, cerotic, dodecylenic, palmitoleic, oleic, linoleic, linolenic, erucic, benzoic, naphthoic acids and substituted napthoic acids, 1-methyl-2 naphthoic acid and 2-isopropyl-1-naphthoic acid, etc.

Typically, an acid catalyst or a transesterification catalyst is used in the polyester type 1 polymerization and non-limiting examples of those are the metal catalysts such as acetates of manganese, zinc, calcium, cobalt or magnesium, and antimony(III)oxide, germanium oxide or halide and tetraalkoxygermanium, titanium alkoxide, zinc or aluminum salts.

Referring to the examples 1 and 3 regarding polyester type 2, polymers of this type may generally be obtained by ring-opening polymerization of one or more cyclic esters, which includes glycolides, lactides, lactones and carbonates. The polymerization process may take place in the presence of at least one appropriate catalyst such as metal catalysts, of which stannous octoate is a non-limiting example and the polymerization process may be initiated by initiators such as polyols, polyamines or other molecules with multiple hydroxyl or other reactive groups and mixtures thereof.

EXAMPLE 5

Preparation of Gum Bases

All the gum bases are prepared with the following basic formulation:

| No | Type | Elastomer | Resin | Ratio of elastomer/resin |
|---|---|---|---|---|
| 201 | bio base | Elastomer polymer from example 3 | Resin polymer from example 1 | 50/50 |
| 202 | bio base | Elastomer polymer from example 4 | Resin polymer from example 2 | 50/50 |
| 203 | bio base | Elastomer polymer from example 4 | Resin polymer from example 1 | 5/95 |
| 204 | bio base | Elastomer polymer from example 4 | Resin polymer from example 1 | 10/90 |
| 205 | bio base | Elastomer polymer from example 4 | Resin polymer from example 1 | 25/75 |
| 206 | bio base | Elastomer polymer from example 4 | Resin polymer from example 1 | 40/60 |
| 207 | bio base | Elastomer polymer from example 4 | Resin polymer from example 1 | 50/50 |
| 208 | bio base | Elastomer polymer from example 4 | Resin polymer from example 1 | 60/40 |
| 209 | Bio base | Elastomer polymer from example 4 | Resin polymer from example 1 | 80/20 |
| 210 | Bio base | Elastomer polymer from example 4 | Resin polymer from example 1 | 95/5 |

The gum bases are prepared as follows:

The elastomer and resin are added to a mixing kettle provided with mixing means e.g. horizontally placed Z-shaped arms. The kettle has been preheated for 15 minutes to a temperature of about 60-80° C. The mixture is mixed for 10-20 minutes until the whole mixture becomes homogeneous.

The mixture is then discharged into the pan and allowed to cool to room temperature from the discharged temperature of 60-80° C.

EXAMPLE 6

Preparation of Chewing Gum

All chewing gum formulations are prepared with the following basic formulation:

| Peppermint: | |
|---|---|
| Ingredients | Percent by weight |
| Gum base | 32 |
| Sorbitol | 43.8 |
| Lycasin | 3 |
| Peppermint oil | 1.5 |
| Menthol crystals | 0.5 |
| Aspartame | 0.1 |
| Acesulfame | 0.1 |
| Xylitol | 6 |

-continued

| Peppermint: | |
|---|---|
| Ingredients | Percent by weight |
| Softeners | 6 |
| Emulsifiers | 2 |
| Fillers | 5 |

The softeners, emulsifiers and fillers may alternatively be added to the polymers as a part of the gum base preparation.

TABLE 2

| Peppermint chewing gum | | |
|---|---|---|
| Chewing gum | Added ingredients | Gum base Ref. |
| 2001 | 2% lecithin, 2% glycerin | 201 |
| 2002 | 2% lecithin, 2% glycerin | 202 |
| 2003 | — | 203 |
| 2004 | — | 204 |
| 2005 | — | 205 |
| 2006 | — | 206 |
| 2007 | 2% lecithin, 2% glycerin | 207 |
| 2008 | — | 208 |
| 2009 | — | 209 |
| 2010 | — | 210 |

The chewing gum products are prepared as follows:

The gum base is added to a mixing kettle provided with mixing means like e.g. horizontally placed Z-shaped arms. The kettle has been preheated for 15 minutes to a temperature of about 60-80° C. or the chewing gum is made in one step, immediately after preparation of gum base in the same mixer where the gum base and kettle has a temperature of about 60-80° C.

One half portion of the sorbitol is added together with the gum base and mixed for 3 minutes. Peppermint and menthol are then added to the kettle and mixed for 1 minute. The remaining half portion of sorbitol is added and mixed for 1 minute. Softeners are slowly added and mixed for 7 minutes. Then aspartame and acesulfame are added to the kettle and mixed for 3 minutes. Xylitol is added and mixed for 3 minutes. The resulting gum mixture is then discharged and e.g. transferred to a pan at a temperature of 40-48° C. The gum is then rolled and scored into cores, sticks, balls, cubes, and any other desired shape, optionally followed by coating and polishing processes prior to packaging.

Evidently, within the scope of the invention, other processes and ingredients may be applied in the process of manufacturing the chewing gum. Variations of different ingredients are listed and explained below.

The chewing gum according to the invention may comprise coloring agents. According to an embodiment of the invention, the chewing gum may comprise color agents and whiteners such as FD&C-type dyes and lakes, fruit and vegetable extracts, titanium dioxide and combinations thereof. Further useful chewing gum base components include antioxidants, e.g. butylated hydroxytoluene (BHT), butyl hydroxyanisol (BHA), propylgallate and tocopherols, and preservatives.

In an embodiment of the invention, the chewing gum comprises softeners in an amount of about 0 to about 18% by weight of the chewing gum, more typically about 0 to about 12% by weight of the chewing gum.

Softeners/emulsifiers may according to the invention be added both in the chewing gum and the gum base.

A gum base formulation may, in accordance with the present invention, comprise one or more softening agents e.g. sucrose polyesters including those disclosed in WO 00/25598, which is incorporated herein by reference, tallow, hydrogenated tallow, hydrogenated and partially hydrogenated vegetable oils, cocoa butter, degreased cocoa powder, glycerol monostearate, glycerol triacetate, lecithin, mono-, di- and triglycerides, acetylated monoglycerides, fatty acids (e.g. stearic, palmitic, oleic and linoleic acids), and combinations thereof. As used herein the term "softener" designates an ingredient, which softens the gum base or chewing gum formulation and encompasses waxes, fats, oils, emulsifiers, surfactants and solubilisers.

To soften the gum base further and to provide it with water-binding properties, which confer to the gum base a pleasant smooth surface and reduce its adhesive properties, one or more emulsifiers is/are usually added to the composition, typically in an amount of 0 to 18% by weight, preferably 0 to 12% by weight of the gum base. Mono- and diglycerides of edible fatty acids, lactic acid esters and acetic acid esters of mono- and diglycerides of edible fatty acids, acetylated mono and diglycerides, sugar esters of edible fatty acids, Na-, K-, Mg- and Ca-stearates, lecithin, hydroxylated lecithin and the like are examples of conventionally used emulsifiers which can be added to the chewing gum base. In case of the presence of a biologically or pharmaceutically active ingredient as defined below, the formulation may comprise certain specific emulsifiers and/or solubilisers in order to disperse and release the active ingredient.

Waxes are conventionally used for the adjustment of the consistency and for softening of the chewing gum base when preparing chewing gum bases. In connection with the present invention any conventionally used and suitable type of wax may be used, such as for instance rice bran wax, polyethylene wax, petroleum wax (refined paraffin and microcrystalline wax), paraffin, bees' wax, carnauba wax or candelilla wax. In an embodiment of the invention, the gum base is wax-free.

In an embodiment of the invention, the chewing gum comprises filler.

A chewing gum base formulation may, if desired, include one or more fillers/texturisers including as examples, magnesium and calcium carbonate, sodium sulphate, ground limestone, silicate compounds such as magnesium and aluminum silicate, kaolin and clay, aluminum oxide, silicium oxide, talc, titanium oxide, mono-, di- and tri-calcium phosphates, cellulose polymers, such as wood, and combinations thereof.

In an embodiment of the invention, the chewing gum comprises filler in an amount of about 0 to about 50% by weight of the chewing gum, more typically about 10 to about 40% by weight of the chewing gum.

In the present context, chewing gum ingredients may for example comprise bulk sweeteners, high-intensity sweeteners, flavoring agents, softeners, emulsifiers, coloring agents, binding agents, acidulants, fillers, antioxidants and other components such as pharmaceutically or biologically active substances, conferring desired properties to the finished chewing gum product.

Suitable bulk sweeteners include both sugar and non-sugar sweetening components. Bulk sweeteners typically constitute from about 5 to about 95% by weight of the chewing gum, more typically about 20 to about 80% by weight such as 30 to 60% by weight of the gum.

Useful sugar sweeteners are saccharide-containing components commonly known in the chewing gum art including, but not limited to, sucrose, dextrose, maltose, dextrins, trehalose, D-tagatose, dried invert sugar, fructose, levulose, galactose, corn syrup solids, and the like, alone or in combination.

Sorbitol can be used as a non-sugar sweetener. Other useful non-sugar sweeteners include, but are not limited to, other sugar alcohols such as mannitol, xylitol, hydrogenated starch hydrolysates, maltitol, isomaltol, erythritol, lactitol and the like, alone or in combination.

High-intensity artificial sweetening agents can also be used alone or in combination with the above sweeteners. Preferred-high intensity sweeteners include, but are not limited to sucralose, aspartame, salts of acesulfame, alitame, saccharin and its salts, cyclamic acid and its salts, glycyrrhizin, dihydrochalcones, thaumatin, monellin, sterioside and the like, alone or in combination. In order to provide longer lasting sweetness and flavor perception, it may be desirable to encapsulate or otherwise control the release of at least a portion of the artificial sweetener. Techniques such as wet granulation, wax granulation, spray drying, spray chilling, fluid bed coating, coascervation, encapsulation in yeast cells and fiber extrusion may be used to achieve the desired release characteristics. Encapsulation of sweetening agents can also be provided using another chewing gum component such as a resinous compound.

Usage level of the artificial sweetener will vary considerably and will depend on factors such as potency of the sweetener, rate of release, desired sweetness of the product, level and type of flavor used and cost considerations. Thus, the active level of artificial sweetener may vary from about 0.02 to about 30% by weight, preferably 0.02 to about 8% per weight. When carriers used for encapsulation are included, the usage level of the encapsulated sweetener will be proportionately higher. Combinations of sugar and/or non-sugar sweeteners can be used in the chewing gum formulation processed in accordance with the invention. Additionally, the softener may also provide additional sweetness such as aqueous sugar or alditol solutions.

If a low calorie gum is desired, a low caloric bulking agent can be used. Examples of low caloric bulking agents include polydextrose, Raftilose, Raftilin, fructooligosaccharides (NutraFlora®), palatinose oligosaccharides; guar gum hydrolysates (e.g. Sun Fiber®) or indigestible dextrins (e.g. Fibersol®). However, other low calorie-bulking agents can be used.

The chewing gum according to the present invention may contain aroma agents and flavoring agents including natural and synthetic flavorings e.g. in the form of natural vegetable components, essential oils, essences, extracts, powders, including acids and other substances capable of affecting the taste profile. Examples of liquid and powdered flavorings include coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits mentioned above.

The chewing gum flavor may be a natural flavoring agent, which is freeze-dried, preferably in the form of a powder, slices or pieces or combinations thereof. The particle size may be less than 3 mm, less than 2 mm or more preferred less than 1 mm, calculated as the longest dimension of the particle. The natural flavoring agent may in a form where the particle size is from about 3 µm to 2 mm, such as from 4 µm to 1 mm. Preferred natural flavoring agents include seeds from fruit e.g. from strawberry, blackberry and raspberry.

Various synthetic flavors, such as mixed fruit flavors may also be used in the present chewing gum centers. As indicated above, the aroma agent may be used in quantities smaller than those conventionally used. The aroma agents and/or flavors may be used in the amount from 0.01 to about 30% by weight of the final product depending on the desired intensity of the aroma and/or flavor used. Preferably, the content of aroma/flavor is in the range of 0.2 to 3% by weight of the total composition.

In an embodiment of the invention, the flavoring agents comprise natural and synthetic flavorings in the form of natural vegetable components, essential oils, essences, extracts, powders, including acids and other substances capable of affecting the taste profile Further chewing gum ingredients, which may be included in the chewing gum according to the present invention, include surfactants and/or solubilisers, especially when pharmaceutically or biologically active ingredients are present. As examples of types of surfactants to be used as solubilisers in a chewing gum composition according to the invention, reference is made to H. P. Fiedler, Lexikon der Hilfstoffe für Pharmacie, Kosmetik und Angrenzende Gebiete, page 63-64 (1981) and the lists of approved food emulsifiers of the individual countries. Anionic, cationic, amphoteric or non-ionic solubilisers can be used. Suitable solubilisers include lecithin, polyoxyethylene stearate, polyoxyethylene sorbitan fatty acid esters, fatty acid salts, mono and diacetyl tartaric acid esters of mono and diglycerides of edible fatty acids, citric acid esters of mono and diglycerides of edible fatty acids, saccharose esters of fatty acids, polyglycerol esters of fatty acids, polyglycerol esters of interesterified castor oil acid (E476), sodium stearoyllatylate, sodium lauryl sulfate and sorbitan esters of fatty acids and polyoxyethylated hydrogenated castor oil (e.g. the product sold under the trade name CREMOPHOR), block copolymers of ethylene oxide and propylene oxide (e.g. products sold under trade names PLURONIC and POLOXAMER), polyoxyethylene fatty alcohol ethers, polyoxyethylene sorbitan fatty acid esters, sorbitan esters of fatty acids and polyoxyethylene steraric acid esters.

Particularly suitable solubilisers are polyoxyethylene stearates, such as for instance polyoxyethylene(8)stearate and polyoxyethylene(40)stearate, the polyoxyethylene sorbitan fatty acid esters sold under the trade name TWEEN, for instance TWEEN 20 (monolaurate), TWEEN 80 (monooleate), TWEEN 40 (monopalmitate), TWEEN 60 (monostearate) or TWEEN 65 (tristearate), mono and diacetyl tartaric acid esters of mono and diglycerides of edible fatty acids, citric acid esters of mono and diglycerides of edible fatty acids, sodium stearoyllatylate, sodium laurylsulfate, polyoxyethylated hydrogenated castor oil, blockcopolymers of ethylene oxide and propyleneoxide and polyoxyethylene fatty alcohol ether. The solubiliser may either be a single compound or a combination of several compounds. In the presence of an active ingredient, the chewing gum may preferably also comprise a carrier known in the art.

In one embodiment the chewing gum according to the invention comprises a pharmaceutically, cosmetically or biologically active substance. Examples of such active substances, a comprehensive list of which is found e.g. in WO 00/25598, which is incorporated herein by reference, include drugs, dietary supplements, antiseptic agents, pH-adjusting agents, anti-smoking agents and substances for the care or treatment of the oral cavity and teeth such as hydrogen peroxide and compounds capable of releasing urea during chewing. Examples of useful active substances in the form of antiseptics include salts and derivatives of guanidine and biguanidine (for instance chlorhexidine diacetate) and the following types of substances with limited water-solubility: quaternary ammonium compounds (e.g. ceramine, chloroxylenol, crystal violet, chloramine), aldehydes (e.g. paraformaldehyde), derivatives of dequaline, polynoxyline, phenols (e.g. thymol, p-chlorophenol, cresol), hexachlorophene, salicylic anilide compounds, triclosan, halogenes (iodine, iodophores, chloroamine, dichlorocyanuric acid salts), alcohols (3,4 dichlorobenzyl alcohol, benzyl alcohol, phenoxyethanol, phenylethanol), cf. also Martindale, The Extra Pharmacopoeia, 28th edition, page 547-578; metal salts, complexes and compounds with limited water-solubility, such as aluminum salts, (for instance aluminum potassium sulphate $AIK(SO_4)_2,12H_2O$) and salts, complexes and compounds of boron, barium, strontium, iron, calcium, zinc, (zinc acetate, zinc chloride, zinc gluconate), copper (copper chloride, copper sulphate), lead, silver, magnesium, sodium, potassium, lithium, molybdenum, vanadium should be included; other compositions for the care of mouth and teeth: for instance salts, complexes and compounds containing fluorine (such as sodium fluoride, sodium monofluorophosphate, aminofluorides, stannous fluoride), phosphates, carbonates and selenium. Further active substances can be found in J. Dent.Res. Vol. 28 No. 2, page 160-171,1949.

Examples of active substances in the form of agents adjusting the pH in the oral cavity include: acids, such as adipinic acid, succinic acid, fumaric acid, or salts thereof or salts of citric acid, tartaric acid, malic acid, acetic acid, lactic acid, phosphoric acid and glutaric acid and acceptable bases, such as carbonates, hydrogen carbonates, phosphates, sulphates or oxides of sodium, potassium, ammonium, magnesium or calcium, especially magnesium and calcium.

Active ingredients may comprise the below-mentioned compounds or derivates thereof but are not limited thereto: Acetaminophen, Acetylsalicylic acid, Buprenorphin, Bromhexin Celcoxib Codeine, Diphenhydramin, Diclofenac, Etoricoxib, Ibuprofen, Indometacin, Ketoprofen, Lumiracoxib, Morphine, Naproxen, Oxycodon, Parecoxib, Piroxicam, Rofecoxib, Tenoxicam, Tramadol, Valdecoxib, Calciumcarbonat, Magaldrate, Disulfiram, Bupropion, Nicotine, Azithromycin, Clarithromycin, Clotrimazole, Erythromycin, Tetracycline, Granisetron, Ondansetron, Prometazin, Tropisetron, Brompheniramine, Ceterizin, leco-Ceterizin, Chlorcyclizine, Chlorpheniramin, Chlorpheniramin, Difenhydramine, Doxylamine, Fenofenadin, Guaifenesin, Loratidin, des-Loratidin, Phenyltoloxamine, Promethazin, Pyridamine, Terfenadin, Troxerutin, Methyldopa, Methylphenidate, Benzalcon. Chloride, Benzeth. Chloride, Cetylpyrid. Chloride, Chlorhexidine, Ecabet-sodium, Haloperidol, Allopurinol, Colchinine, Theophylline, Propanolol, Prednisolone, Prednisone, Fluoride, Urea, Miconazole, Actot, Glibenclamide, Glipizide, Metformin, Miglitol, Repaglinide, Rosiglitazone, Apomorfin, Cialis, Sildenafil, Vardenafil, Diphenoxylate, Simethicone, Cimetidine, Famotidine, Ranitidine, Ratinidine, cetrizin, Loratadine, Aspirin, Benzocaine, Dextrometorphan, Ephedrine, Phenylpropanolamine, Pseudoephedrine, Cisapride, Domperidone, Metoclopramide, Acyclovir, Dioctylsulfosucc., Phenolphtalein, Almotriptan, Eletriptan, Ergotamine, Migea, Naratriptan, Rizatriptan, Sumatriptan, Zolmitriptan, Aluminum salts, Calcium salts, Ferro salts, Silver salts, Zinc-salts, Amphotericin B, Chlorhexidine, Miconazole, Triamcinolonacetonid, Melatonine, Phenobarbitol, Caffeine, Benzodiazepiner, Hydroxyzine, Meprobamate, Phenothiazine, Buclizine, Brometazine, Cinnarizine, Cyclizine, Difenhydramine, Dimenhydrinate, Buflomedil, Amphetamine, Caffeine, Ephedrine, Orlistat, Phenylephedrine, Phenylpropanolamin, Pseudoephedrine, Sibutramin, Ketoconazole, Nitroglycerin, Nystatin, Progesterone, Testosterone, Vitamin B12, Vitamin C, Vitamin A, Vitamin D, Vitamin E, Pilocarpin, Aluminumaminoacetat, Cimetidine, Esomeprazole, Famotidine, Lansoprazole, Magnesiumoxide, Nizatide and or Ratinidine.

Generally, it is preferred that the chewing gum and the gum bases prepared according to the invention is based solely on biodegradable polymers. However, within the scope of the invention further conventional chewing gum elastomers or elastomer plasticizers may be applied. Thus, in an embodiment of the invention, the at least one biodegradable polymer comprises from at least 5% to at least 90% of the chewing gum polymers and where the rest of the polymers comprise polymers generally regarded as non-biodegradable, such as natural resins, synthetic resins and/or synthetic elastomers.

The chewing gum according to the invention may be provided with an outer coating. The applicable hard coating may be selected from the group comprising of sugar coating and a sugarless coating and a combination thereof. The hard coating may e.g. comprise 50 to 100% by weight of a polyol selected from the group consisting of sorbitol, maltitol, mannitol, xylitol, erythritol, lactitol and Isomalt and variations thereof. In an embodiment of the invention, the outer coating is an edible film comprising at least one component selected from the group consisting of an edible film-forming agent and a wax. The film-forming agent may e.g. be selected from the group comprising cellulose derivative, a modified starch, a dextrin, gelatine, shellac, gum arabic, zein, a vegetable gum, a synthetic polymer and any combination thereof. In an embodiment of the invention, the outer coating comprises at least one additive component selected from the group comprising of a binding agent, a moisture-absorbing component, a film-forming agent, a dispersing agent, an antisticking component, a bulking agent, a flavoring agent, a coloring agent, a pharmaceutically or cosmetically active component, a lipid component, a wax component, a sugar, an acid and an agent capable of accelerating the after-chewing degradation of the degradable polymer.

In a further embodiment of the invention, the outer coating is a soft coating. The soft coating may comprise sugar free coating agent.

EXAMPLE 7

An experiment was set up in order to test chewing gum 2001 containing the blend of pure polyester type 2 polymer based gum base compared with chewing gum 2007 containing the gum base based on a mixture of polyester type 1 and polyester type 2 polymers 2007, prepared and described in EXAMPLE 6.

The gum centers were chewed in a chewing machine (CF Jansson). The chewing frequency was set to 1 Hz, a pH buffer was used as saliva and the temperature was set at 37° C. The chewing time was set to 60 seconds. After chewing, the chewed cud was measured using a rheometer, type AR1000 from TA Instruments. The oscillation measurement is performed at a stress within the linear viscoelastic region at a temperature of 37° C. with a parallel plate system (d=2.0 cm, hatched). G' vs. shear rate, and G', G" vs. frequency.

The results from these measurements can be seen in FIG. 1 (stress sweep) and FIG. 2 (frequency sweep).

From FIG. 1 it can be seen that the chewing gum formulation containing polymer blends has a higher elastic modulus, meaning the chewing gum 2007 has improved texture property compared to the chewing gum formulation 2001 which contains only polyester type 2 based polymers.

FIG. 2 shows both the storage modulus G" and the elastic modulus G', a crossover between G' and G" is a sign of high elasticity, a crossover found at low frequency means higher elasticity compared with a crossover found at higher frequency. Again it is found that 2007 has higher elasticity compared to 2001 resulting in a crossover found at lower frequency.

The above rheological results confirm the fact that chewing gum containing gum bases made with the right combination of different polymers (polyester type 1 elastomer and polyester type 2 resin) has a texture closer to conventional gum bases and chewing gum, as compared to chewing gum containing gum bases only consisting of polyester type 2 based polymers.

The two chewing gum samples 2001 and 2007 were tested by serving them to the sensory panellists in tasting booths made in accordance with ISO 8598 standards at room temperature in 40 ml tasteless plastic cups with randomised 3-figure codes. Test samples were evaluated after chewing for 0-0.30 minutes (initial phase 1), 0.30-1 minutes (initial phase 2), 1-1.30 minutes (initial phase 3), 1-1.30 minutes (intermediate phase 1), 4-4.30 minutes (intermediate 2), 4.30-5 minutes (intermediate phase 3), 9-9.30 minutes (end phase 1), 9.30-10 minutes (end phase 2) respectively. Between each sample tested, the panellists were allowed a break of 3 minutes. Every test is repeated.

The following texture parameters were assessed: softness, juicy, mint, cooling, slippery, sweetness, bitter note, elasticity and volume. For each of these parameters, the panellists were required to provide their assessments according to an arbitrary scale of 0-15. The data obtained were processed using a FIZZ computer program (French Bio System) and the results were transformed to sensory profile diagrams as shown in FIG. 3, FIG. 4 and FIG. 5. The major differences between test chewing gums in all phases were the following:

Chewing gums prepared with a gum base comprising of a mixture of polyester type 1 and polyester type 2 polymers showed a significantly higher elasticity, bigger volume and softer texture than corresponding chewing gums prepared with a gum base based only on polyester type 2 polymers. All three parameters are different in a positive direction compared with polyester type 2 based chewing gums, which lacks elasticity, volume and softness.

Major differences were also found on taste parameters in the intermediate and end testing phase, were the chewing gum based on a mixture of polyester type 1 and polyester type 2 showed significant higher mint, cooling and sweetness sensations. This is an important improvement compared to polyester type 2 biodegradable formulations where the period of flavor sensation is somewhat short compared to conventional chewing gum.

EXAMPLE 8

An experiment was set up in order to measure the influence of different blends of polyester type 1 and polyester type 2 (203-210).

Accordingly, the following rheological parameters were measured using a rheometer, as described in Example 7. All gum base formulations were evaluated measuring stress sweep and frequency sweep at 100° C.

The results are summarized in FIGS. 6 and 7, as it appears that the higher amount of elastomer polymer as described in Example 4, the higher elastic property of the respective gum bases. From FIG. 7 it appears that none of the gum bases shows crossovers between G' and G", but there is a clear tendency showing G' and G" get closer with a higher content of elastomer.

The rheology of gum bases containing low amounts of elastomer (203 and 204) shows similar curves, due to the minor difference in elastomer content.

EXAMPLE 9

In table 3 a number of formulations are evaluated by a panel according to sweetness, mint, cooling, juicy, elasticity, softness 1, softness 2, volume and creakiness. The scale used for the evaluation was as follows: 1 being the lowest rating and 5 being the highest rating.

TABLE 3

Sensory evaluation of peppermint chewing gum prepared with different ratios of polyester type 1 elastomer and polyester type 2 resin.

| Chewing gum | Gum base | Ratio elastomer/resin | Sweetness | Mint | Cooling | Juicy | Elasticity | Soft-ness 1 | Soft-ness 2 | Volume | Creaky |
|---|---|---|---|---|---|---|---|---|---|---|---|
| 2003 | 203 | 5/95 | 3 | 3 | 2 | 3 | 1 | 1 | 1 | 1 | 0 |
| 2004 | 204 | 10/90 | 3 | 3 | 2 | 3 | 2 | 1 | 2 | 2 | 0 |
| 2005 | 205 | 25/75 | 3 | 3 | 2 | 4 | 2 | 2 | 3 | 2 | 0 |
| 2006 | 206 | 40/60 | 2 | 2 | 2 | 3 | 3 | 3 | 3 | 3 | 0 |
| 2008 | 208 | 60/40 | 4 | 2 | 3 | 3 | 4 | 2 | 4 | 4 | 0 |
| 2009 | 209 | 80/20 | 3 | 3 | 3 | 3 | 4 | 2 | 2 | 4 | 0 |
| 2010 | 210 | 95/5 | 2 | 2 | 3 | 3 | 5 | 2 | 3 | 4 | 0 |

As it can be seen from table 3, using different combinations of different polymers offers the possibility of adjusting the texture and flavor into the desired properties.

Different combinations of polyester type 1 elastomer and polyester type 2 resin give different texture and flavor profiles.

The profile shows higher elasticity with increasing amount of polyester type 1 elastomer. Moreover, based on the overall sensory texture evaluations on elasticity, softness, volume and creakiness, it is observed that there is an optimum texture profile found when using the combination 60% polyester type 1 elastomer and 40% polyester type 2 resin.

The invention claimed is:

1. Chewing gum comprising at least two different biodegradable polymers,
   wherein at least two of said biodegradable polymers comprise a polyester polymer,
   wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
   wherein at least one of said at least two different biodegradable polymers comprises at least one biodegradable elastomer plasticizer, said biodegradable plasticizer comprising at least one biodegradable polymer,
   wherein the chewing gum is substantially free of non-biodegradable polymers,
   wherein said at least one biodegradable polymer produced through reaction of at least one alcohol or derivative thereof and at least one acid or derivative thereof has a polydispersity (PD) of 1.1 to 20, and
   wherein at least one of said at least two different biodegradable polymers comprises a polyester obtained by polymerization of at least one cyclic ester.

2. Chewing gum comprising at least two different biodegradable polymers according to claim 1, wherein said alcohol derivative comprises an ester of an alcohol.

3. Chewing gum comprising at least two different biodegradable polymers according to claim 1, wherein said acid derivative comprises esters, anhydrides or halides of carboxylic acids.

4. Chewing gum comprising at least two different biodegradable polymers according to claim 1, wherein said acid derivative comprises methyl esters of acids.

5. Chewing gum comprising at least two different biodegradable polymers according to claim 1, wherein said alcohols or derivatives thereof comprise polyols.

6. Chewing gum comprising at least two different biodegradable polymers according to claim 1, wherein said acids or derivatives thereof comprise polyfunctional carboxylic acids.

7. Chewing gum comprising at least two different biodegradable polymers according to claim 1, wherein said polyester obtained by polymerization of at least one cyclic ester is at least partly derived from $\alpha$-hydroxy acids such as lactic and glycolic acids.

8. Chewing gum comprising at least two different biodegradable polymers according to claim 1, wherein said polyester obtained by polymerization of at least one cyclic ester is at least partly derived from $\alpha$-hydroxy acids and where the obtained polyester comprises at least 20 mole % $\alpha$-hydroxy acid units.

9. Chewing gum comprising at least two different biodegradable polymers according to claim 1, wherein at least two or more cyclic esters are selected from the group consisting of glycolides, lactides, lactones, cyclic carbonates and mixtures thereof.

10. Chewing gum comprising at least two different biodegradable polymers according to claim 9, wherein the lactones are chosen from the group consisting of $\epsilon$-caprolactone, $\delta$-valerolactone, $\gamma$-butyrolactone, $\beta$-propiolactone, and mixtures thereof, and wherein the lactones are optionally substituted with one or more alkyl or aryl substituents at any non-carbonyl carbon atom along the ring, including compounds in which two substituents are contained on the same carbon atom.

11. Chewing gum comprising at least two different biodegradable polymers according to claim 9, wherein the cyclic carbonate is selected from the group consisting of trimethylene carbonate, 5-alkyl-1,3-dioxan-2-one, 5,5-dialkyl-1,3-dioxan-2-one, or 5-alkyl-5-alkyloxycarbonyl-1,3-dioxan-2-one, ethylene carbonate, 3-ethyl-3-hydroxymethyl, propylene carbonate, trimethylolpropane monocarbonate, 4,6dimethyl-1,3-propylene carbonate, 2,2-dimethyl trimethylene carbonate, 1,3-dioxepan-2-one and mixtures thereof.

12. Chewing gum comprising at least two different biodegradable polymers according to claim 1, wherein cyclic ester polymers and their copolymers resulting from the polymerization of cyclic ester monomers are selected from the group consisting of poly (L-lactide); poly (D-lactide); poly (D, L-lactide); poly (mesolactide); poly (glycolide); poly (trimethylenecarbonate); poly (epsilon-caprolactone); poly (L-lactide-co-D, L-lactide); poly (L-lactide-co-meso-lactide); poly (L-lactide-co-glycolide); poly (L-lactide-co-trimethylenecarbonate); poly (L-lactide-co-epsilon-caprolactone); poly (D, L-lactide-co-meso-lactide); poly (D, L-lactide-co-glycolide); poly (D, L-lactide-co-trimethylenecarbonate); poly (D, L-lactide-co-epsilon-caprolactone); poly (meso-lactide-co-glycolide); poly (meso-lactide-co-trimethylenecarbonate); poly (meso-lactide-co-epsilon-caprolactone); poly (glycolide-cotrimethylenecarbonate); and poly (glycolide-co-epsilon-caprolactone).

13. Chewing gum comprising at least two different biodegradable polymers according to claim 1, wherein said polyester obtained by polymerization of at least one cyclic ester has a PD of 1.1 to 15.

14. Chewing gum comprising at least two different biodegradable polymers according to claim 1, wherein at least one of said at least one biodegradable elastomers comprises a polyester produced through reaction of at least one alcohol or derivative thereof and at least one acid or derivative thereof.

15. Chewing gum comprising at least two different biodegradable polymers according to claim 14, wherein said elastomer is produced through reaction of at least one acid chosen from the group consisting of terephthalic, phthalic, adipic, pimelic acids and combinations thereof with at least one alcohol chosen from the groups of diethylene and 1,4-butylene diols and combinations thereof.

16. Chewing gum comprising at least two different biodegradable polymers according to claim 1, wherein at least one of said biodegradable elastomer plasticizers comprises a polyester produced through reaction of at least one alcohol or derivative thereof and at least one acid or derivative thereof.

17. Chewing gum comprising at least two different biodegradable polymers according to claim 16, wherein said elastomer plasticizer is produced through reaction of at least one acid chosen from the group consisting of terephthalic, succinic, malonic, and adipic acids and combinations thereof with at least one alcohol chosen from the group consisting of ethylene, diethylene or 1,4-butylene diols and combinations thereof.

18. Chewing gum comprising at least two different biodegradable polymers according to claim 16, wherein said at least one biodegradable elastomer plasticizer produced through reaction of at least one alcohol or derivative thereof and at least one acid or derivative thereof has a molecular weight of 500-19000 g/mol (Mn).

19. Chewing gum comprising at least two different biodegradable polymers,
    wherein at least two of said biodegradable polymers comprise a polyester polymer,
    wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
    wherein at least one of said at least two different biodegradable polymers comprises at least one biodegradable elastomer plasticizer, said biodegradable plasticizer comprising at least one biodegradable polymer,
    wherein the chewing gum is substantially free of non-biodegradable polymers,
    wherein said at least one biodegradable polymer produced through reaction of at least one alcohol or derivative thereof and at least one acid or derivative thereof has a polydispersity (PD) of 1.1 to 20, and
    wherein at least one of said biodegradable elastomers comprises a polyester obtained by polymerization of at least one cyclic ester.

20. Chewing gum comprising at least two different biodegradable polymers according to claim 19, wherein the molecular weight of said biodegradable elastomer comprising at least one of said polyesters obtained by polymerization of at least one cyclic ester is within the range of 10000-1000000 g/mol (Mn).

21. Chewing gum comprising at least two different biodegradable polymers,
    wherein at least two of said biodegradable polymers comprise a polyester polymer,
    wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
    wherein at least one of said at least two different biodegradable polymers comprises at least one biodegradable elastomer plasticizer, said biodegradable plasticizer comprising at least one biodegradable polymer,
    wherein the chewing gum is substantially free of non-biodegradable polymers,
    wherein said at least one biodegradable polymer produced through reaction of at least one alcohol or derivative thereof and at least one acid or derivative thereof has a polydispersity (PD) of 1.1 to 20, and
    wherein said biodegradable elastomer plasticizer comprises a polyester obtained by polymerization of at least one cyclic ester.

22. Chewing gum comprising at least two different biodegradable polymers according to claim 1, wherein said chewing gum comprises at least one elastomer plasticizer comprising at least one of said polyesters obtained by polymerization of at least one cyclic ester and at least one elastomer comprising at least one of said polyesters produced through reaction of at least one alcohol or derivative thereof and at least one acid or derivative thereof.

23. Chewing gum comprising at least two different biodegradable polymers according to claim 1, wherein the at least two different polymers are hydrophilic.

24. Chewing gum comprising at least two different biodegradable polymers,
    wherein at least two of said biodegradable polymers comprise a polyester polymer,
    wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
    wherein at least one of said at least two different biodegradable polymers comprises at least one biodegradable elastomer plasticizer, said biodegradable plasticizer comprising at least one biodegradable polymer,
    wherein the chewing gum is substantially free of non-biodegradable polymers,
    wherein said at least one biodegradable polymer produced through reaction of at least one alcohol or derivative thereof and at least one acid or derivative thereof has a polydispersity (PD) of 1.1 to 20, and wherein the difference in molecular weight between the at least two different polymers is at least 1000 g/mol Mn.

25. Chewing gum comprising at least two different biodegradable polymers,
  wherein at least two of said biodegradable polymers comprise a polyester polymer,
  wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
  wherein at least one of said at least two different biodegradable polymers comprises at least one biodegradable elastomer plasticizer, said biodegradable plasticizer comprising at least one biodegradable polymer,
  wherein the chewing gum is substantially free of non-biodegradable polymers,
  wherein said at least one biodegradable polymer produced through reaction of at least one alcohol or derivative thereof and at least one acid or derivative thereof has a polydispersity (PD) of 1.1 to 20, and
  wherein said at least two different biodegradable polymers have molecular weights differing by at least 20,000 g/mol (Mn).

26. Chewing gum comprising at least two different biodegradable polymers according to claim 21, wherein the molecular weight of said biodegradable elastomer plasticizer comprising said polyester obtained by polymerization of at least one cyclic ester is in the range of 500-19000 g/mol.

27. Chewing gum comprising at least two different biodegradable polymers,
  wherein at least two of said biodegradable polymers comprise a polyester polymer,
  wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
  wherein at least one of said at least two different biodegradable polymers comprises at least one biodegradable elastomer plasticizer, said biodegradable plasticizer comprising at least one biodegradable polymer,
  wherein the chewing gum is substantially free of non-biodegradable polymers,
  wherein said at least one biodegradable polymer produced through reaction of at least one alcohol or derivative thereof and at least one acid or derivative thereof has a polydispersity (PD) of 1.1 to 20, and
  wherein said at least two different biodegradable polymers have a different glass transition temperature Tg.

28. Chewing gum comprising at least two different biodegradable polymers,
  wherein at least two of said biodegradable polymers comprise a polyester polymer,
  wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
  wherein at least one of said at least two different biodegradable polymers comprises at least one biodegradable elastomer plasticizer, said biodegradable plasticizer comprising at least one biodegradable polymer,
  wherein the chewing gum is substantially free of non-biodegradable polymers,
  wherein said at least one biodegradable polymer produced through reaction of at least one alcohol or derivative thereof and at least one acid or derivative thereof has a polydispersity (PD) of 1.1 to 20, and
  wherein at least one of the at least two different biodegradable polymers has a glass transition temperature of at least +1° C.

29. Chewing gum comprising at least two different biodegradable polymers,
  wherein at least two of said biodegradable polymers comprise a polyester polymer,
  wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
  wherein at least one of said at least two different biodegradable polymers comprises at least one biodegradable elastomer plasticizer, said biodegradable plasticizer comprising at least one biodegradable polymer,
  wherein the chewing gum is substantially free of non-biodegradable polymers,
  wherein said at least one biodegradable polymer produced through reaction of at least one alcohol or derivative thereof and at least one acid or derivative thereof has a polydispersity (PD) of 1.1 to 20, and
  wherein at least one of the at least two different biodegradable polymers has a glass transition temperature of less than 0° C.

30. Chewing gum comprising at least two different biodegradable polymers,
  wherein at least two of said biodegradable polymers comprise a polyester polymer,
  wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
  wherein at least one of said at least two different biodegradable polymers comprises at least one biodegradable elastomer plasticizer, said biodegradable plasticizer comprising at least one biodegradable polymer,
  wherein the chewing gum is substantially free of non-biodegradable polymers,
  wherein said at least one biodegradable polymer produced through reaction of at least one alcohol or derivative thereof and at least one acid or derivative thereof has a polydispersity (PD) of 1.1 to 20, and
  wherein the resulting chewing gum has at least two different glass transition temperatures Tg.

31. Chewing gum comprising at least two different biodegradable polymers,
  wherein at least two of said biodegradable polymers comprise a polyester polymer,
  wherein at least one of said at least two different biodegradable polymers comprises an elastomer comprising a polyester produced through reaction of at least one alcohol or derivative thereof and at least one acid or derivative thereof and having a molecular weight of 10,000 to 250,000 g/mol (Mn),
  wherein at least one of said at least two different biodegradable polymers comprises at least one biodegradable elastomer plasticizer, said biodegradable plasticizer comprising at least one biodegradable polymer, wherein the chewing gum is substantially free of non-biodegradable polymers, wherein said at least one biodegradable polymer produced through reaction of at least one alcohol or derivative thereof and at least one acid or derivative thereof has a polydispersity (PD) of 1.1 to 20, and wherein the chewing gum comprises at least one biodegradable elastomer having a glass transition temperature Tg below 0° C. and at least one biodegradable plasticizer having a glass transition temperature Tg exceeding 0° C.

32. Chewing gum comprising at least two different biodegradable polymers according to claim 1, wherein said chewing gum comprises at least one biodegradable elastomer in the amount of about 0.5 to about 70% by weight of the chewing gum, at least one biodegradable plasticizer in the amount of about 0.5 to about 70% by weight of the chewing gum and at least one chewing gum ingredient chosen from the group consisting of softeners, sweeteners, flavoring agents, active ingredients and fillers in the amount of about 2 to about 80% by weight of the chewing gum.

33. Chewing gum comprising at least two different biodegradable polymers according to claim 1, wherein said chewing gum comprises flavoring agents.

34. Chewing gum comprising at least two different biodegradable polymers according to claim 33, wherein said chewing gum comprises flavoring agents in the amount of 0.01 to about 30% by weight, said percentage being based on the total weight of the chewing gum.

35. Chewing gum comprising at least two different biodegradable polymers according to claim 1, wherein said chewing gum comprises sweeteners.

36. Chewing gum comprising at least two different biodegradable polymers according to claim 35, wherein the chewing gum comprises bulk sweeteners in the amount of about 5 to about 95% by weight of the chewing gum.

37. Chewing gum comprising at least two different biodegradable polymers according to claim 35, wherein the chewing gum comprises high-intensity sweeteners in the amount of about 0 to about 3% by weight of the chewing gum.

38. Chewing gum comprising at least two different biodegradable polymers according to claim 1, wherein the chewing gum comprises at least one softener in the amount of about 0 to about 18% by weight of the chewing gum.

39. Chewing gum comprising at least two different biodegradable polymers according to claim 1, wherein said chewing gum comprises active ingredients.

40. Chewing gum comprising at least two different biodegradable polymers according to claim 1, wherein the chewing gum comprises filler in an amount of about 0 to about 50% by weight of the chewing gum.

41. Chewing gum comprising at least two different biodegradable polymers according to claim 1, wherein the chewing gum comprises at least one coloring agent.

42. Chewing gum comprising at least two different biodegradable polymers according to claim 1, wherein the chewing gum is coated with an outer coating.

43. Chewing gum comprising at least two different biodegradable polymers according to claim 1, wherein said chewing gum comprises at least one elastomer comprising said polyester obtained by polymerization of at least one cyclic ester and at least one elastomer plasticizer comprising at least one polyester produced through reaction of at least one alcohol or derivative thereof and at least one acid or derivative thereof.

44. Chewing gum comprising at least two different biodegradable polymers according to claim 1 wherein said chewing gum is substantially wax-free.

45. Chewing gum comprising at least two different biodegradable polymers according to claim 1, wherein said chewing gum comprises wax.

46. Chewing gum according to claim 1, wherein the chewing gum is a gum base.

47. Chewing gum comprising at least two different biodegradable polymers according to claim 28, wherein at least one of the at least two different biodegradable polymers having a glass transition temperature of at least +1° C. is a plasticizer.

* * * * *